(12) United States Patent
Kastella et al.

(10) Patent No.: US 7,609,382 B2
(45) Date of Patent: Oct. 27, 2009

(54) SYSTEM AND METHOD OF DETECTING ENTANGLED PHOTONS

(75) Inventors: Keith Kastella, Gregory, MI (US);
Kenneth Augustyn, Plymouth, MI (US);
Ralph Conti, Ypsilanti, MI (US);
Richard Freeling, Brighton, MI (US)

(73) Assignee: General Dynamics Advanced Information System, Inc,, Arlington, VA (US)

(*) Notice: Subject to any disclaimer, the term of this patent is extended or adjusted under 35 U.S.C. 154(b) by 238 days.

(21) Appl. No.: 10/850,394

(22) Filed: May 21, 2004

(65) Prior Publication Data
US 2005/0006593 A1 Jan. 13, 2005

Related U.S. Application Data

(60) Provisional application No. 60/472,731, filed on May 23, 2003.

(51) Int. Cl.
*G01N 21/63* (2006.01)
(52) U.S. Cl. .......................... 356/433; 356/36; 356/484
(58) Field of Classification Search .................. None
See application file for complete search history.

(56) References Cited

U.S. PATENT DOCUMENTS

| | | | |
|---|---|---|---|
| 4,225,938 A | 9/1980 | Turpin | |
| 4,286,328 A | 8/1981 | Bocker | |
| 4,369,363 A | 1/1983 | Quint et al. | |
| 4,468,093 A | 8/1984 | Brown | |
| 4,633,427 A | 12/1986 | Bocker | |
| 5,339,182 A | 8/1994 | Kimble et al. | |
| 5,420,905 A | 5/1995 | Bertozzi | |
| 5,515,438 A | 5/1996 | Bennett et al. | |
| 5,796,477 A * | 8/1998 | Teich et al. | .................. 356/318 |
| 5,917,322 A | 6/1999 | Gershenfeld et al. | |
| 6,057,541 A | 5/2000 | Steenblik | |

(Continued)

FOREIGN PATENT DOCUMENTS

EP 1 091 240 4/2001

(Continued)

OTHER PUBLICATIONS

Keskiner, Eser, Visual—An ultrabright, narrowband source of polarization-entangled photons, RLE Technical Report No. 657, Dec. 2001.*

(Continued)

*Primary Examiner*—Gregory J Toatley, Jr.
*Assistant Examiner*—Rebecca C Slomski
(74) *Attorney, Agent, or Firm*—Hunton & Williams LLP; Jeffrey Scott Leaning

(57) ABSTRACT

A system and method of detecting entangled photon pairs, each pair including a signal photon and an idler photon, is disclosed. Entangled photon pairs are provided having an entanglement time and an entanglement area selected to substantially increase an associated entangled two-photon cross-section of an associated target medium. The entangled photon pairs are also selected to have an energy distribution between the signal photon and the idler photon to substantially decrease an associated random two-photon absorption cross section of the target medium. The entangled photon pairs are directed to the target medium, and at least one entangled-photon pair being absorbed by the target medium is detected.

74 Claims, 19 Drawing Sheets

U.S. PATENT DOCUMENTS

| | | |
|---|---|---|
| 6,252,665 B1 | 6/2001 | Williams et al. |
| 6,272,224 B1 | 8/2001 | Mazourenko et al. |
| 6,289,104 B1 | 9/2001 | Patterson et al. |
| 6,314,189 B1 | 11/2001 | Motoyoshi et al. |
| 6,430,345 B1 | 8/2002 | Dultz et al. |
| 6,444,999 B1 | 9/2002 | Tomita |
| 6,473,719 B1 | 10/2002 | Steenblik |
| 6,480,283 B1 | 11/2002 | Williams et al. |
| 6,522,749 B2 | 2/2003 | Wang |
| 6,424,665 B1 | 7/2003 | Kwiat et al. |
| 6,646,727 B2 | 11/2003 | Saleh et al. |
| 6,678,054 B1 | 1/2004 | Dress et al. |
| 2002/0018290 A1 | 2/2002 | Birk et al. |
| 2002/0020819 A1 | 2/2002 | Wolleschensky et al. |
| 2002/0030186 A1* | 3/2002 | Tomita ..................... 257/14 |
| 2002/0036775 A1* | 3/2002 | Wolleschensky et al. .... 356/317 |
| 2002/0093632 A1 | 7/2002 | Teich et al. |
| 2002/0097874 A1 | 7/2002 | Foden et al. |
| 2002/0109840 A1 | 8/2002 | Wolleschensky et al. |
| 2002/0140941 A1 | 10/2002 | Pedigo |
| 2003/0002670 A1 | 1/2003 | Wang |
| 2003/0086138 A1 | 5/2003 | Pittman et al. |
| 2003/0123516 A1* | 7/2003 | Steinberg et al. ............ 372/102 |
| 2004/0036877 A1 | 2/2004 | Sergienko et al. |
| 2004/0208638 A1 | 10/2004 | Jansen |
| 2005/0094818 A1 | 5/2005 | Inoue et al. |

FOREIGN PATENT DOCUMENTS

| | | |
|---|---|---|
| EP | 1091240 | 4/2001 |
| WO | WO 02/45468 A2 | 6/2002 |
| WO | WO 02/454468 A2 | 6/2002 |
| WO | WO 03/019282 A2 | 3/2003 |
| WO | WO 03/019283 A2 | 3/2003 |
| WO | WO 03/019284 A2 | 3/2003 |

OTHER PUBLICATIONS

Semat et al., Introduction to Atomic and Nuclear Physics, Fifth Edition, " Elements of Quantum Mechanics," pp. 186-215.
Santos et al., Measurement of the degree of polarization entanglement through position interference, Physical Review A, vol. 64.023804, pp. 023804-1 to 023804-6, 2001.
Strekalov et al., Two-photon processes in faint biphoton fields, pp. 1-18, downloaded Mar. 9, 2005, http://arxiv.org
Enzer et al., Entangled-photon six-state quantum cryptography, New Journal of Physics 4 (2002) 45.1-45.8.
Gatti et al., Multi-photon, multi-mode polarization entanglement in parametric down-conversion, pp. 1-22 (download date unknown), http://arxiv.org, Jun. 19, 2003.
Bouwmeester et al., Experimental quantum teleportation, Nature, vol. 390, Dec. 11, 1997, pp. 575-579.
Sciarrino et al., Delayed-choice entanglement swapping with vacuum-one-photon quantum states, Physical Review A, 66, 024309 (2002).
Sergienko et al., Quantum cryptography with femtosecond parametric down conversion, Quantum Imaging Laboratory, pp. 1-8.
Altepeter et al., Ancilla-assisted quantum process tomography, Physical Review Letters, vol. 90, No. 19, May 16, 2003, 193601- to 193601-4.
Oneil, Quantum information studies, Department of Experimental Physics, (http://www.may.ie/academic/physics/quantum.shtml), printed Feb. 25, 2004, 2 pages.
Giacomini et al., Active teleportation of a quantum bit, Physical Review A, 66, 030302(R) (2000).
Jost et al., Spatial correlations of spontaneously down-converted photon pairs detected with a single-photon-sensitive CCD camera, Optics Express 81, Jul. 20, 1998, vol. 3, No. 2.
Caetano et al., Quantum image control through polarization entanglement in parametric down-conversion, Physical Review A 68, 023805 (2003).

Barbosa, Twin photons entangled in polarization and angular momentum, Eur. Phys. J. D22, 433-440 (2003).
Ribeiro et al., Image and coherence transfer in the stimulated down-conversion process, Physical Review A, vol. 60, No. 6, Dec. 1999, 5074-5078.
Monken et al., Transfer of angular spectrum and image formation in spontaneous parametric down-conversion, Physical Review A, vol. 57, No. 4, Apr. 1998, 3123-3126.
Ribeiro et al., Observation of image transfer and phase conjugation in stimulated down-conversion, Physical Review Letters, vol. 87, No. 13, Sep. 24, 2001, 133602-1 to 133602-4.
Fonseca et al., Quantum interference by a nonlocal double slit, Physical Review A, vol. 60, No. 2, Aug. 1999, 1530-1533.
Atature et al., Entanglement in cascaded-crsytal parametric down-conversion, Physical Review Letters, vol. 86, No. 18, Apr. 30, 2001, 4013-4016.
White et al., Nonmaximally entangled states: production, characterization, and utilization, Physical Review Letters, vol. 83, No. 16, Oct. 18, 1999, 3103-3107.
Kwiat et al., Ultrabright source of polarization-entangled photons, Physical Review A, vol. 60, No. 2, Aug. 1999, 773-776.
Kwiat et al., Experimental entanglement distillation and "hidden" non-locality, Letter to Nature, 1014-1017, 2001.
Grover, Quantum computers can search arbitrarily large databases by a single query, Physical Review Letters vol. 79, No. 23, Dec. 8, 1997, 4709-4712.
Berthiaume et al., The quantum challenge to structural complexity theory, 132-137, 1992.
Ekert et al., Quantum computation and Shor's factoring algorithm, Reviews of Modern Physics, vol. 68, No. 3, Jul. 1996, 733-753.
Zhang et al., Experimental and theoretical aspects of quantum teleportation, Center for Engineering Science Advanced Research, 9 pages.
Abouraddy et al., Degree of entanglement for two qubits, Physical Review A, vol. 64, 050101-1 to 050101-4, 2001.
Semat et al., Introduction to Atomic and Nuclear Physics, Fifth Edition, Chp. 7, Elements of quantum mechanics, 186-215.
Ekert, Quantum cryptography based on Bell's theorem, Physical Review Letters, vol. 67, No. 6, Aug. 5, 1991, 661-663.
Schenker, A quantum leap in codes for secure transmissions, International Herald Tribune, printed Apr. 12, 2004, {http://www.iht.com/articles/126822.html}, 3 pages.
Johnson, Magiq employs quantum technology for secure encryption, Advanced Technology, printed Apr. 12, 2004 {http://www.eetimes.com/at/news/OEG20021105S0019}, 3 pages.
McCulagh, Start-up makes quantum leap into cryptography, C/NET News.com, printed Apr. 12, 2004, {http://news.com.com/2100-1029-5103373.html}, 3 pages.
Scully et al., Two-photon scheme for detecting the Bell basis using atomic coherence, Physical Review Letters, vol. 83, No. 21, Nov. 22, 1999, 4433-4436.
Braunstein et al., Dense coding for continuous variables, Physical Review A, vol. 61, 042302-1 to 04302-4, 2000.
Santos et al., Measurement of the degree of polarization entanglement through position interference, Physical Review A, vol. 64, 023804-1 to 023804-6, 2001.
Saleh et al., Entangled-photon virtual-state spectroscopy, Physical Review Letters, vol. 80, No. 16, Apr. 20, 1998, 3483-3486.
Georgiades et al., Nonclassical excitation for atoms in a squeezed vacuum, Physical Review Letters, vol. 75, No. 19, Nov. 6, 1995, 3426-3429.
Joobeur et al., Spatiotemporal coherence properties of entangled light beams generated by parametric down-conversion, Physical Review A , vol. 50, No. 4, Oct. 1994, 3349-3361.
Nasr et al., Biphoton focusing for two-photon excitation, Physical Review A, vol. 65, 023816-1 to 023816-6, 2002.
Abouraddy et al., Role of entanglement in two-photon imaging, Physical Review Letters, vol. 87, No. 12, Sep. 17, 2001, 123602-1 to 123602-4.
Boeuf et al., Calculating characteristics of non-collinear phase-matching in uniaxial biaxial crystals, Optical Technology Division, pp. 1-24, 1999.

Abouraddy at al., Double-slit interference of biphotons generated in spontaneous parametric downconversion from a thick crystal, Journal of Optics B: Quantum and Semiclassical Optics 3, 2001, S50-S54.

Kwiat et al., Experimental verification of decoherence-free subspaces, Science, vol. 290, Oct. 20, 2000, 498-500.

Naik et al., Entangled state quantum cryptography: eavesdropping on the Eckert protocol, Physical Review Letters, vol. 84, No. 20, May 15, 2000, 4733-4736.

Yabushita et al., Spectroscopy by frequency entangled photon pairs, pp. 1-11 (download date unknown), http://arxiv.org, 2003.

Perina et al., Multiphoton absorption cross section and virtual-state spectroscopy for the entangled n -photon state, Physical Review A, vol. 57, No. 5, May 1998, pp. 3972-3986.

Fei et al, Entangled-induced two-photon transparency, Physical Review Letters, vol. 78, No. 9, Mar. 3, 1997, pp. 1679-1682.

Yabushita et al., Spectroscopy by frequency entangled photon pairs, Physical Review A 69. 013806-1-013806-4 (2004).

Kurtsiefer et al., High-efficiency entangled photon pair collection in type-II parametric fluorescence, Physical Review A, vol. 64, 023802-1 to 023802-4, 2001.

Jost et al., Spatial correlations of spontaneously down-converted photon pairs detected with a single-photon-sensitive CCD camera, Optics Express, Jul. 20, 1998, vol. 3, No. 2, pp. 81-88.

Almeida et al., Transmission of quantum images through long distances, pp. 1-4, (download date unknown), http://arxiv.org, 2003.

Caetano et al., Quantum Physics, Abstract, Image formation by manipulation of the entangled angular spectrum, pp. 1-5, (download date unknown), http://arxiv.org.

Zavatta, Premio Italgas/Italgas Prize Energy and Environment 16th Edition, Summary of the Thesis "Debut in the World of Research".

Rubin et al., Theory of two-photon entanglement in type-II optical parametric down-conversion, Physical Review A, vol. 50, No. 6, Dec. 1994, pp. 5122-5133.

Rarity et al., Experimental demonstration of single photon rangefinding using parametric downconversion, Applied Optics, vol. 29, No. 19, Jul. 1, 1990, pp. 2939-2943.

Waks et al., Security of quantum key distribution with entangled photons against individual attacks, Physical Review A, vol. 65, 052310-1 to 052310-16, 2002.

Ribeiro et al., Observation of image transfer and phase conjugation in stimulated down-conversion, pp. 1-6, (download date unknown), http://arxiv.org, 2001.

Caetano et al., Image-polarization entanglement in parametric down-conversion, 4 pages, 2003.

Ribeiro et al., Image and coherence transfer in the stimulated down-conversion process, pp. 1-5, (download date unknown), http://arxiv.org, 1999.

Caetano et al., Quantum distillation of position entanglement with the polarization degrees of freedom, ScienceDirect, Optics Communications, Mar. 3, 2004, (www.sciencedirect.com/science).

Law et al., Analysis and Interpretation of High Transverse Entanglement in Optical Parametric Down Conversion, Physical Review Letters, vol. 92, No. 12, Mar. 26, 2004.

O'Sullivan-Hale et al., Pixel Entanglement: Experimental Realization of Optically Entangled $d=3$ and $d=6$ Qudits, Physical Review Letters, vol. 92, No. 12, Jun. 10, 2005.

Gatti et al., Multi-photon, multi-mode polarization entanglement in parametric down-conversion, pp. 1-22 (download date unknown), http://arxiv.org, 2003.

Oneil, Quantum information studies, Department of Experimental Physics, {http://www.may.ie/academic/physics/quantum.shtml}, printed Feb. 25, 2004, 2 pages.

Bradley et al., Entanglement-induced two-photon transparency, Physical Review Letters, vol. 78, No. 9, Mar. 3, 1997, 1679-1682.

Zavatta, Premio Italgas/Italgas Prize Energy and Environment 16$^{th}$ Edition, Summary of the Thesis "Debut in the World of Research".

Rubin et al., Theory two-photon entanglement in type-II optical parametric down-conversion, Physical Review A, vol. 50, No. 6, Dec. 1994, 5122-5133.

* cited by examiner

SYSTEM AND METHOD OF DETECTING ENTANGLED PHOTONS

CROSS-REFERENCE TO RELATED APPLICATIONS

The present application claims priority to U.S. Provisional Patent Application Ser. No. 60/472,731 filed May 23, 2003, entitled "System and Method of Detecting Entangled Photons," to Kastella et al., the disclosure of which is expressly incorporated by reference herein in its entirety.

BACKGROUND OF THE INVENTION

1. Field of the Invention

The invention relates to detecting entangled photons. In particular, the invention relates to discrimination between entangled photons and non-entangled photons.

2. Discussion of Background Information

Multiple photons may be random or entangled. Random photons are not entangled together and exist as independent entities. In contrast, entangled photons have a connection between their respective properties. Measuring properties of one or more photons in a set of multiply-entangled photons determines properties of the rest of the photons in the set. As understood by those of ordinary skill in the art and by way of non-limiting example, the quantum mechanical state of a set of n>2 multiply-entangled photons cannot be factored into a tensor product of n separate states.

Two photons entangled together are referred to as an entangled-photon pair (also, "biphotons"). Traditionally, photons comprising an entangled-photon pair are called "signal" and "idler" photons, where the signal photon has higher energy. Measuring properties of one photon of an entangled-photon pair determines properties of the other photon, even if the two entangled photons are separated by a distance. As understood by those of ordinary skill in the art and by way of non-limiting example, the quantum mechanical state of an entangled-photon pair cannot be factored into a tensor product of two individual quantum states.

Existing techniques for detecting entangled-photon pairs rely on single-photon counting to detect individual photons that form an entangled pair. These techniques use standard electronic devices to detect and correlate individual photons. Two photons detected in a short temporal interval may indicate that the photons form an entangled-photon pair. The entangled-pair count rate of existing techniques is limited by the speed of photon counting and correlating electronics. In particular, electronics overload limits the intensity of entangled beams that can be considered.

SUMMARY OF THE INVENTION

Because existing techniques can detect entangled photons only in low intensity beams, collection times are long. Moreover, because existing techniques require electronic devices to detect entangled-photon pairs, high-intensity beams of entangled photons cannot readily be used in applications such as entangled beam photo-lithography or entangled beam confocal microscopy.

It is therefore an object of the present invention to detect entangled photons. It is further an object of the present invention to detect entangled photons with a high detection rate. It is also an object of the present invention to detect entangled photons while avoiding detecting non-entangled photons.

According to an embodiment of the invention, a method of detecting entangled-photon pairs is provided, where each entangled-photon pair comprises a signal photon and an idler photon. The method includes providing entangled-photon pairs, at least a first portion of the entangled-photon pairs having an entanglement time and an entanglement area to substantially increase an associated entangled two-photon cross-section of an associated target medium. At least a second portion of the entangled-photon pairs are ensured as having an energy distribution between the signal photon and the idler photon to substantially decrease an associated random two-photon absorption cross section of the target medium. Photons included in the first portion and the second portion are directed to the target medium. At least one entangled-photon pair being absorbed by the target medium is detected.

According to another embodiment on the invention, a method of detecting entangled-photon pairs is provided, where each entangled-photon pair comprises a signal photon and an idler photon. A target medium is supplied. Entangled-photon pairs are received, at least a portion of the entangled-photon pairs being configured to have an entanglement time or an entanglement area to substantially maximize an associated entangled photon cross-section of the medium. The entangled photon pairs also have an energy distribution among the signal photon and the idler photon in each pair to substantially minimize an associated random two-photon absorption cross section of the medium. At least one entangled-photon pair absorption by the medium is detected.

According to another embodiment of the invention, a method of providing entangled-photon pairs having a large entangled-photon pair cross section and a small random photon pair cross section is provided. Entangled photon pairs are provided having at least one of: an entanglement time to substantially maximize an associated entangled photon cross-section for a predetermined target medium, and an entanglement area to substantially maximize an associated entangled photon cross-section for a pre-determined target medium. Entangled-photon pairs are selected having an energy distribution among a signal photon and an idler photon to substantially minimize an associated random photon pair absorption cross section of the target medium. The entangled photons are sent to a receiver configured to cause at least a portion of the entangled photons to come into contact with the target medium.

According to another embodiment of the invention, a method of detecting entangled photons is provided. Entangled photons tailored for entangled photon absorption by a corresponding target medium are produced. The entangled photons are conditioned to reduce random multi-photon absorption by the target medium. The entangled photons are directed to the target medium. At least one entangled-photon absorption by the target medium is detected.

According to another embodiment of the invention, a method of providing entangled photons having high entangled-photon absorption and low random multi-photon absorption for a corresponding target medium is provided. Entangled photons tailored for entangled photon absorption by the target medium are produced. The entangled photons are conditioned to reduce random multi-photon absorption by the target medium. The entangled photons are sent to a receiver configured to cause at least a portion of the entangled photons to come into contact with the target medium.

According to another embodiment of the invention, a method of detecting entangled photons is provided. Entangled photons tailored for entangled-photon absorption by a corresponding target medium are received. These received entangled photons are conditioned to reduce random multi-photon absorption by the target medium. The entangled photons are caused to come into contact with the target medium. At least one entangled-photon absorption by the target medium is detected.

According to another embodiment of the invention, a system for detecting entangled photons is provided. The system includes an entangled photon source configured to produce entangled photons tailored for entangled-photon absorption by a corresponding target medium. The system also includes a screen configured to pass entangled photons having an energy distribution selected to reduce random multi-photon absorption by the target medium and a sensor configured to detect entangled-photon absorption by the target medium.

According to another embodiment of the invention, a system for producing entangled photons having high entangled-photon absorption and low random multi-photon absorption for a particular target medium is provided. The system includes an entangled photons source configured for producing entangled photons tailored for entangled-photon absorption by the target medium. The system also includes a screen configured to pass entangled-photon pairs having an energy distribution selected to reduce random photon absorption by the target medium.

According to another embodiment of the invention, a system for detecting entangled photons is provided. The system includes a target medium configured to absorb entangled photons tailored for entangled-photon absorption by the target medium, the entangled photons being conditioned to reduce random photon absorption by the target medium. The system also includes a sensor configured to detect at least one entangled photon absorption by the target medium.

According to another embodiment of the invention, a method of detecting entangled photons is provided. Entangled photons having properties suitable for entangled-photon absorption by a corresponding target medium are produced. The entangled photons are directed to the target medium. At least one entangled-photon absorption by the target medium is detected.

According to another embodiment of the invention, a method of providing entangled photons having a high entangled-photon absorption rate is provided. Entangled photons having properties suitable for entangled photon absorption by a corresponding target medium are produced. The entangled photons are sent to a receiver configured to cause at least a portion of the entangled photons to come into contact with the medium.

According to another embodiment of the invention, a method of detecting entangled photons is provided. Entangled photons having properties suitable for entangled-photon absorption by a corresponding target medium are received. The entangled photons are caused to come into contact with the target medium. At least one entangled-photon absorption by the target medium is detected.

According to another embodiment of the invention, a system for detecting entangled photons is provided. The system includes an entangled photon source configured to produce entangled photons having properties suitable for entangled-photon absorption by a corresponding target medium and a sensor configured to detect entangled-photon absorption by the target medium.

According to another embodiment of the invention, a system for producing entangled photons having high entangled-photon absorption is provided. The system includes an entangled photon source configured for producing entangled photons having properties suitable for entangled-photon absorption by a corresponding target medium.

According to another embodiment of the invention, a system for detecting entangled photos is provided. The system includes a target medium configured to absorb entangled photons having properties suitable for entangled-photon absorption by the target medium. The system also includes a sensor configured to detect entangled photon absorption by the target medium.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, the description taken with the drawings provides a fundamental understanding of the present invention, making apparent to those skilled in the art how the several forms of the present invention may be embodied in practice.

Figure 1:
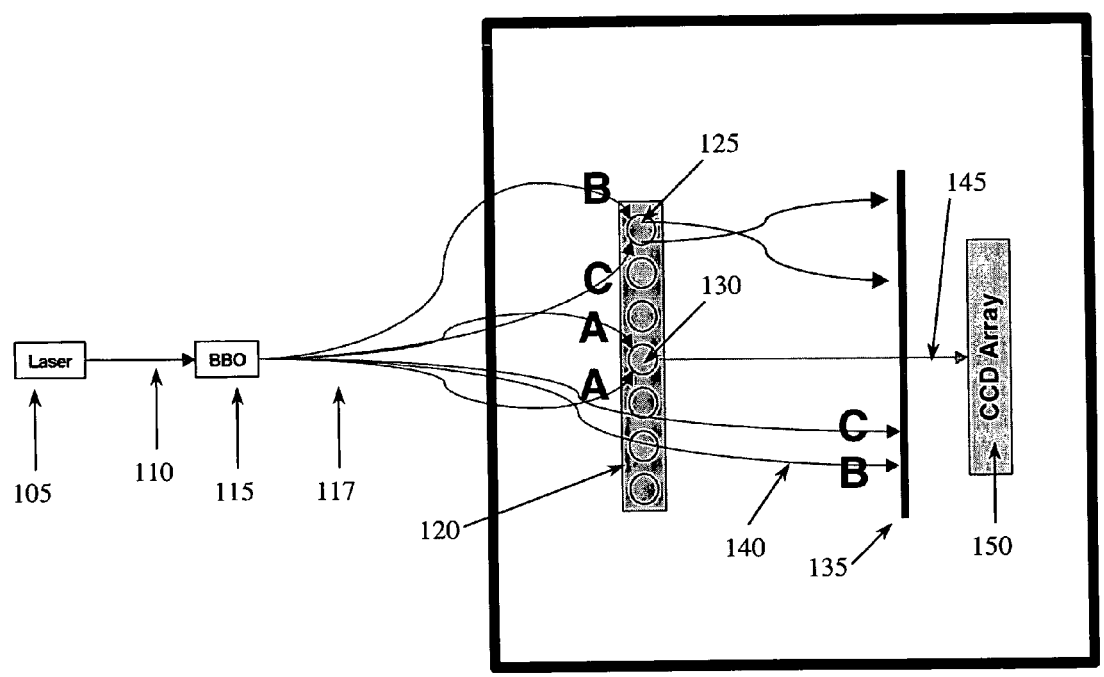
FIG. 1 is a schematic diagram of a generalized apparatus for detecting entangled-photon pairs.

FIG. 1 depicts an apparatus for detecting entangled-photon pairs. Laser 105 produces classical (i.e., non-entangled) blue light 110, which is sent to nonlinear crystal 115. Nonlinear crystal 115, discussed further below, converts classical light to entangled-photon light. Blue non-entangled photons 110 enter nonlinear crystal 115, and are there converted to red entangled-photon pairs 117, including, for example, entangled pairs AA, BB, and CC. Entangled-photon pairs 117 are thereafter directed to biphoton sensitive material ("BSM") 120.

Absorbing entangled-photon pairs makes BSM 120 fluoresce. Molecule 130 of BSM 120 first absorbs entangled-photon pair AA through the process of entangled-photon pair absorption. Entangled-photon pair absorption (also, "entangled two-photon absorption," "ETPA," or "biphoton absorption") is a type of two-photon absorption. Molecule 130 produces green fluorophoton 145 in response to absorbing entangled-photon pair AA. Fluorophoton 135 passes through green-pass filter 135 to strike charge coupled device (CCD) array 150. CCD array 150 detects green fluorophoton 145, which indicates entangled-photon pair absorption by BSM 120.

BSM 120 does not generally absorb random photons. The term "random" refers to both individual photons (that may be entangled with another photon or photons), and to multiple photons that are not entangled together (but that may be entangled with other photons).

Individual photons from entangled-photon pairs (e.g., photon B 140) are generally not absorbed by BSM 120. BSM 120 is effectively transparent to individual photons. Because individual photons from entangled pairs are generally not absorbed by BSM 120, individual photons do not cause BSM 120 to fluoresce and activate CCD array 150. Individual photons generally pass thorough BSM 120 without being absorbed and are stopped by green-pass filter 135. Individual photons therefore do not reach and are not detected by CCD array 150. Individual photons are examples of random photons.

Cousin photon pairs intersecting the same molecule of BSM 120 are generally not absorbed. Cousin photons are photons that are not entangled together, but may be entangled with other photons. By way of non-limiting example, cousin photon pair BC includes one photon from each of the entangled-photon pairs BB and CC. BSM molecule 125 does not absorb cousin photon pair BC. BSM 120 is effectively transparent to cousin photon pairs. Because cousin photon pairs are generally not absorbed by BSM 120, cousin photon pairs do not cause BSM 120 to fluoresce and activate CCD array 120. Instead, cousin photon pairs pass through BSM 120 and are stopped by green-pass filter 135 before reaching CCD array 150. Cousin photons are a type of random photons.

The particular colors of light described in reference to FIG. 1 are for exemplary purposes and are not meant to be limiting.

Figure 2:
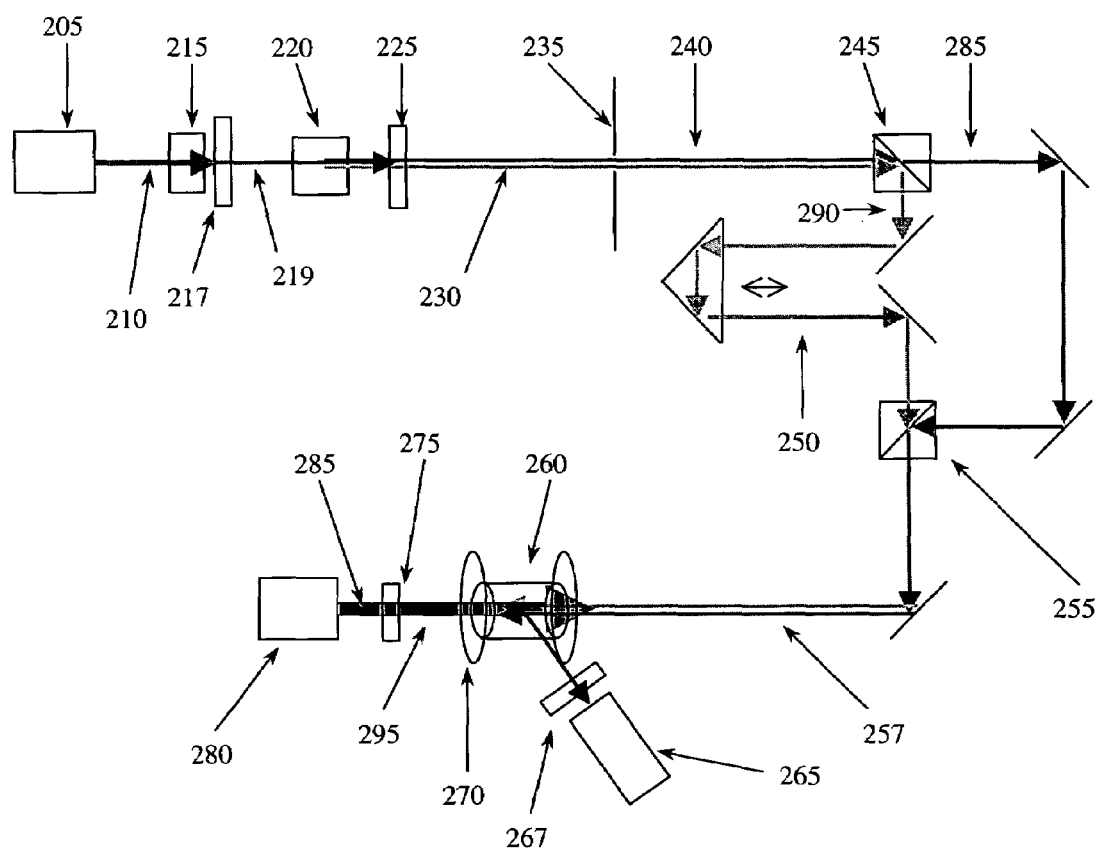
FIG. 2 is a schematic diagram of an apparatus for detecting entangled-photon pairs.

FIG. 2 depicts in detail an apparatus for detecting entangled-photon pairs. Pulsed dye laser 205 produces, by way of non-limiting example, 385 THz (778 nm wavelength) photons 210. Other light frequencies may be used in other embodiments. Light 210 passes through doubling crystal 215, which doubles the frequency of light 210 to produce 771 THz (389 nm) light 219. Filter 217 blocks any 385 THz light that might have gotten through doubling crystal 215, while allowing 771 THz light 219 to pass. Light 219 leaves filter 217 and enters a preferably 5 mm×5 mm×5 mm beta barium borate (BBO) crystal 220, which converts single photons into entangled-photon pairs 230 via collinear type II down-conversion. A 25 mm×10 mm×10 mm BBO crystal may be used in other embodiments. Such a crystal, having an 25 mm optical axis, allows for the production of signal photons and idler photons with narrow bandwidths. Other materials may be used that produce entangled-photon pairs in other embodiments. It is known to those of ordinary skill in the art how to determine whether a material produces entangled photons.

Collinear signal photon and idler photon beams need not be used in other embodiments of the present invention. By way of non-limiting example, an embodiment of the present invention may select signal photons at 3° from the center (pump beam) line. Continuing this example, the embodiment may select idler photons at 3° from the center line and diametrically opposed to the selected signal photons. The signal photon beam and idler photon beam are thus separated by a total of 6° in such an exemplary embodiment.

Entangled-photon pairs 230 are then culled to leave only pairs with a particular energy distribution. Frequency-selective aperture 235 selects entangled-photon pairs 240 having, by way of non-limiting example, one 385 THz (779 nm) photon and one 386 THz (777 nm) photon. The frequencies of the signal and idler photons sum to the frequency of light 219 (771 THz) that produced the entangled pairs. Frequency-selective aperture prevents entangled-photon pairs with unwanted energy distributions between the signal and idler from passing. In other embodiments, other energy distributions may be used.

Entangled-photon pairs 240 are then prepared by delaying one of the photons. To delay one photon, polarizing beam splitter ("PBS") 245 first separates each entangled-photon pair 240 into signal photon 290 and idler photon 285. Next, mirror apparatus 250 lengthens the path of, by way of non-limiting example, signal photon 290. The lengthened path produces a delay on the order of picoseconds. Photons 285, 290 are then returned to the same path 257 via PBS 255. The amount of delay is discussed further below in reference to FIGS. 8-10. In other embodiments, delaying one photon is not required.

Entangled-photon pairs 257 then enter prepared BSM cell 260, which contains, by way of non-limiting example, 3.00 linear meters of rubidium-87 ("$^{87}$Rb") vapor held at about 0.2 atmospheres pressure. BSM cell 260 produces fluorophotons of about 420 nm wavelength upon absorbing biphotons. Fluorophotons pass through interference filter 267, which allows 714 THz (420 nm) light to pass. By way of non-limiting example, avalanche photodiode (APD) 265 then detects fluorophotons.

Prior to absorbing entangled-photon pairs, the quantum state of the $^{87}$Rb in BSM cell 260 is preferably prepared. The $^{87}$Rb in BSM cell 260 is first pumped via external cavity diode laser ("ECDL") 280. ECDL 280 produces 377 THz (795 nm) light 285, which is circularly polarized by quarter-wave plate combination 275 and directed to BSM cell 260. Circularly polarized light 295 transfers angular momentum to the $^{87}$Rb in BSM cell 260. This angular momentum pumps the quantum state of the $^{87}$Rb to a preferred state for absorbing biphotons. BSM cell 265 is further prepared by magnetic field coils 270, which condition the quantum mechanical hyperfine levels of the $^{87}$Rb in BSM cell 265. The preferred initial quantum mechanical state for $^{87}$Rb in BSM cell 260 is discussed further below in reference to FIG. 6. Magnetic field coils 270 impose a polarization direction for an initial $^{87}$Rb state and also select a final state. Two possible transitions are available for $^{87}$Rb prepared as described. One transition produces fluorescence as a result of biphoton absorption, described above.

The other transition does not occur because of the selection of the frequencies of signal and idler light 257. Other ways of preparing the $^{87}$Rb quantum state are contemplated; the above-described preparation is not meant to be limiting. In other embodiments, no BSM quantum state preparation is required.

Parameters similar to those of the embodiment of FIG. 2 may be employed in another embodiment of the present invention. Such an embodiment produces evidence of entangled-photon absorption by ejecting 762 nm fluorophotons. These fluorophotons are sufficiently different in wavelength from the signal photons and idler photons so as to be capable of selection using an appropriately-configured filter. As with the embodiment of FIG. 2, an APD may be used to detect the fluorophotons. A 3.0 cm long $^{87}$Rb vapor cell may be used.

Figure 3:
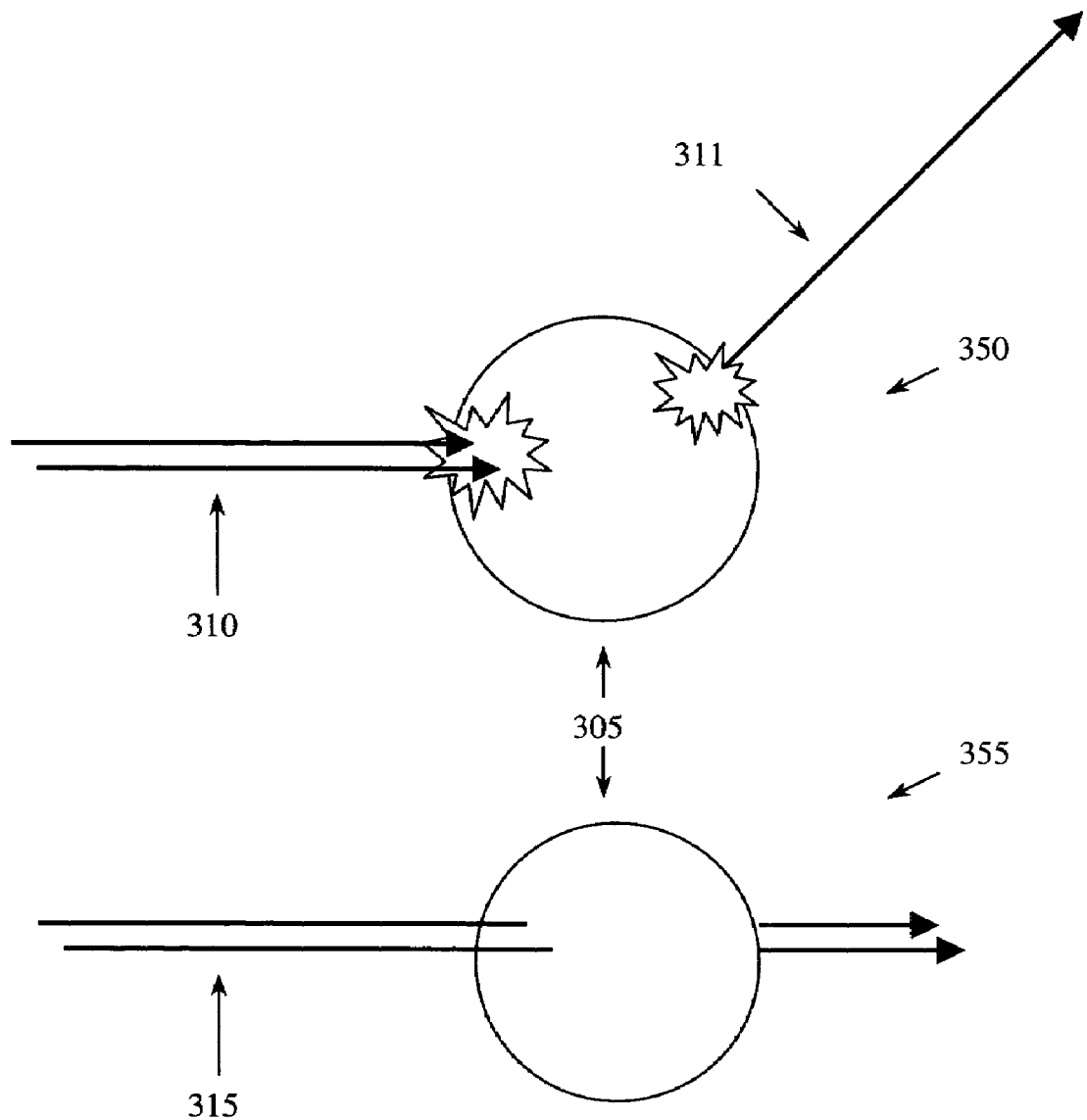
FIG. 3 depicts a molecule with a large entangled two-photon adsorption cross section and a small random two-photon absorption cross section.

FIG. 3 schematically illustrates a material 305 with a large entangled two-photon adsorption (ETPA) cross-section and a small random two-photon absorption (RTPA) cross-section. The description of FIG. 3 is not limited to any particular embodiment. The cross-section of a material 305 for a particular type of radiation (e.g., entangled-photon pairs, random photon pairs) indicates the probability of absorbing that type of radiation. Material 305 absorbs 350 entangled-photon pairs 310 (which produces fluorophoton 311) with a high probability. The same material 305 allows random photons 315 to pass 355 without being absorbed, also with a high probability (e.g., molecule 305 is substantially transparent to random photon pairs). Material 305 therefore has an entangled two-photon absorption cross-section that is larger than its random two-photon absorption cross-section.

RTPA cross-section indicates how transparent material 305 is to random photon pairs 315. The smaller the RTPA cross-section, the less likely material 305 is to absorb random photon pairs 315. The RTPA cross-section of material 305 may be described as, by way of non-limiting example:

$$\sigma_e = \frac{\pi}{2} \omega_1 \omega_2 \delta(\varepsilon_f - \varepsilon_i - \omega_1 - \omega_2) |M_r|^2. \quad (1)$$

In equation (1), $\delta$ is a function that is zero, unless its argument is zero in which case its value is one. $\epsilon_i$ is the initial electron energy of the material in initial state $|\psi_i\rangle$. $\epsilon_f$ is the final electron energy of the material in final state $|\psi_f\rangle$ after random two-photon absorption. $\omega_I$ is the first photon's frequency. $\omega_2$ is the second photon's frequency. $M_r$ is the random two-photon absorption matrix element described further below in reference to equation (3). Equation (1) indicates that the RTPA cross section is generally zero unless the sum of the frequencies of the two photons is equal to the difference between an initial energy and a permissible final energy of the molecule (i.e., unless $\epsilon_f - \epsilon_i = \omega_1 + \omega_6$). When that condition obtains, the RTPA cross section is equal to $\pi/2$ times the product of the two photon frequencies, times the absolute value of the RTPA matrix element squared. Other equations may be used to describe RTPA cross-section. Modifications of equation (1) may also be used.

The rate of random photon absorption tells the rate at which a particular material absorbs random photons. By way of non-limiting example, the rate of random two-photon absorption may be described as:

$$R_r = \frac{\pi}{2} \omega_1 \omega_2 |M_r|^2 \delta(\varepsilon_f - \varepsilon_i - \omega_1 - \omega_2) \phi^2. \quad (2)$$

The parameters of equation (2) are the same as described above in reference to equation (1), except that $\phi$ represents the flux of the random photons incident on the material in question, in terms of number of events per area per time. The rate of random photon absorption is generally equal to the RTPA cross section multiplied by the square of the flux of the incident random photons. Other equations for describing random photon absorption rates may be used in addition to, or instead of, equation (2). Modifications of equation (2) may also be used.

The RTPA matrix element $M_r$ is related to the RTPA cross-section. The smaller the RTPA matrix element, the more transparent the material is to random photon pairs. The RTPA matrix element $M_r$ may be described as, by way of non-limiting example:

$$M_r \equiv \sum_j \left\{ \frac{D_{21}^{(j)}}{\Delta_1^{(j)} - i\kappa_j/2} + \frac{D_{12}^{(j)}}{\Delta_2^{(j)} - i\kappa_j/2} \right\}. \quad (3)$$

Figure 4:
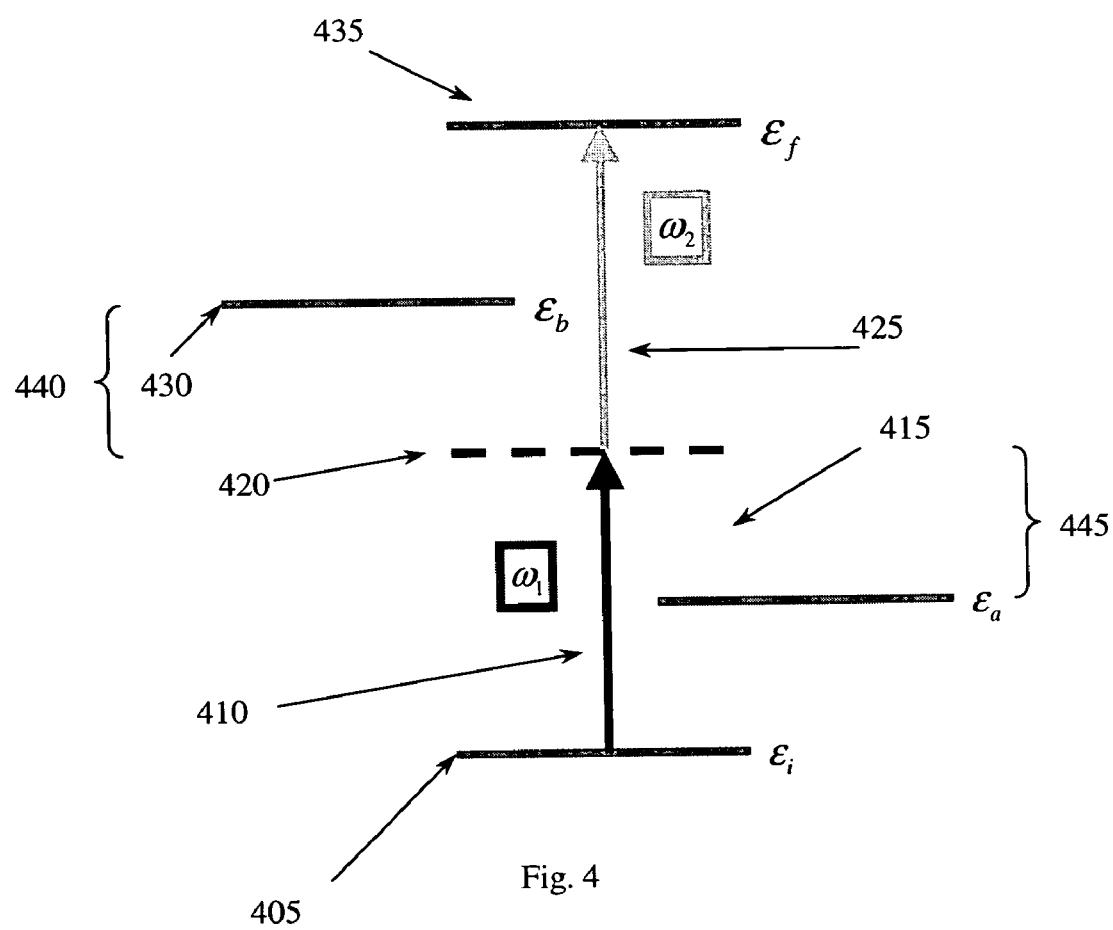
FIG. 4 is a schematic diagram of energy levels in a molecule.

In equation (3), the index j of the sum spans energy states $|\psi_j\rangle$ intermediate between $|\psi_i\rangle$ and $|\psi_f\rangle$ with energies $\epsilon_j$ for $j \geq 1$. Note that for calculation purposes, j may span all, or just a selection of, intermediate states (generally, the more states spanned by j, the more accurate the calculation). Energy mismatches, discussed further below in reference to FIG. 4, are denoted $\Delta_1^{(j)} = \epsilon_j - \epsilon_i - \omega_1$ and $\Delta_2^{(j)} = \epsilon_j - \epsilon_i - \omega_2$. The line width of each state $|\psi_j\rangle$, known to those of ordinary skill in the art, is denoted $\kappa_j$. Each state $|\psi_j\rangle$ exists for a period of time, and the line width $\kappa_j$ is related to the reciprocal of the lifetime of state $|\psi_j\rangle$. Preferably, each line width is much smaller than the corresponding energy mismatch (i.e., $\kappa_j << \Delta_i^{(j)}$ for i=1,2). The transition dipole element, generally given by $D_{k1}^{(j)} = \langle \psi_f | d_k | \psi_j \rangle \langle \psi_j | d_1 | \psi_i \rangle$, represents the ease with which a charge may move within the material, where each $d_p$ is the dipole operator of polarization p, and either k=1 and 1=2, or k=2 and 1=1. Equation (3) accounts for both possible orders of arrival of the two photons of frequencies $\omega_1$ and $\omega_2$. The first term in brackets in equation (3) represents the photon of frequency $\omega_1$ being absorbed first. The second term represents the photon of frequency a being absorbed first. Alternate equations for calculating RTPA matrix elements may be used in addition to or instead of equation (3). Modifications of equation (3) may also be used.

ETPA cross-section tells how transparent material 305 is to entangled-photon pairs 310. The larger the ETPA cross-section, the more likely material 305 absorbs entangled-photon pairs 310. The ETPA cross-section of material 305 may be described as, by way of non-limiting example:

$$\sigma_e = \frac{\pi}{4A_e T_e} \omega_1 \omega_2 \delta(\varepsilon_f - \varepsilon_i - \omega_1 - \omega_2) |M_e|^2. \quad (4)$$

In equation (4), $\delta$, $\epsilon_i$, $\epsilon_f$ are as defined above in reference to equation (1). In addition, $\omega_1$ and $\omega_2$ are the frequencies of the entangled signal and idler photons, respectively. The $\delta$ in equation (4) indicates that generally, for entangled two-photon absorption to occur, the sum of the frequencies of the signal and idler photons must equal the difference between the molecule's permissible initial and final energies (i.e., $\epsilon_f - \epsilon_i = \omega_1 + \omega_2$). Equation (4) states that, in that case, the ETPA cross-section is typically equal to π/4 times the product of the two photon frequencies, times the absolute value of the RTPA matrix element squared, divided by entanglement area $A_e$ and entanglement time $T_e$. Reducing the size of $A_e$ and $T_e$ (described further below in reference to FIGS. 7-13) will generally increase ETPA cross section. Alternate equations for describing ETPA matrix elements may be used in addition to or instead of equation (4). Modifications of equation (4) may also be used.

The rate of entangled-photon absorption tells the rate at which a particular material absorbs entangled photons. The rate of entangled-photon absorption may be described as, by way of non-limiting example:

$$R_e = \frac{\pi}{2}\omega_1\omega_2|M_e|^2\delta(\varepsilon_f - \varepsilon_i - \omega_1 - \omega_2)\phi_c\phi. \quad (5)$$

The parameters of equation (5) are the same as described above in reference to equation (4), except that φ represents the flux of the entangled photons incident on the material in question, and the critical flux is given by $\phi_c = \frac{1}{2}T_e A_e$. Equation (5) indicates that the rate of entangled-photon absorption is generally equal to the ETPA cross section multiplied by the actual flux of the incident random photons, divided by twice the product of the entanglement time and the entanglement area. Alternate equations for calculating the entangled-photon absorption rate may be used in addition to or instead of equation (5). Modifications of equation (5) may also be used.

The ETPA matrix element Me is related to the ETPA cross-section. The larger the ETPA matrix element, the more likely it is that entangled-photon pairs will be absorbed. The ETPA matrix element $M_e$ may be described as, by way of non-limiting example:

$$M_e \equiv \sum_j \left\{ D_{21}^{(j)} \frac{1 - \exp[iT_e(\Delta_1^{(j)} - i\kappa_j/2)]}{\Delta_1^{(j)} - i\kappa_j/2} + D_{12}^{(j)} \frac{1 - \exp[iT_e(\Delta_2^{(j)} - i\kappa_j/2)]}{\Delta_2^{(j)} - i\kappa_j/2} \right\}. \quad (6)$$

In equation (6), j, $D_{k1}^{(j)}$, $\Delta_1^{(j)}$, $\Delta_2^{(j)}$, and $\kappa_j$ are as above in reference to equation (3). Equation (6) differs from equation (3) in that each term in the brackets has an additional factor, namely $\exp[-iT_e(\Delta_k^{(j)} - i\kappa_j/2)]$ for k=1, 2. The differences between equations (3) and (6) indicate that a material's RTPA matrix element may differ from its ETPA matrix element. Alternate equations for calculating the ETPA matrix element may be used in addition to or instead of equation (6). Modifications of equation (6) may also be used.

FIG. 4 is a schematic diagram of a generic molecule's energy levels. Energy levels are shown as horizontal bars. Bars closer to the top of the drawing represent higher energy levels than those represented by bars closer to the bottom. Molecular energy levels generally affect both random and entangled two-photon absorption. FIG. 4 depicts a molecule with four (4) distinct energy levels 405, 415, 430, 435. However, molecules with more or less than four energy levels may be used. By way of non-limiting example, initial ground state 405 has energy $\epsilon_i = 0$, first intermediate state 415 has energy $\epsilon_a = E/3$, second intermediate state 430 has energy $\epsilon_b = 2E/3$, and final state 435 has energy $\epsilon_f = E$. Absorbing a properly-conditioned photon pair excites the material from an initial state 405 to a final state 435. Before two-photon absorption, the molecule is in initial state 405 with energy $\epsilon_i$. A first photon of frequency at then excites the molecule, causing a transition 410 to virtual state 420. The energy c of virtual state 420 might not equal either of the intermediate energy levels $\epsilon_a$ and $\epsilon_b$. A second photon of frequency a subsequently excites the molecule, causing a transition 425 that places the molecule in final state 435 with energy $\epsilon_f$.

In reference to FIG. 4, RTPA and ETPA matrix elements may be calculated, by way of non-limiting example, for a material with four energy levels. By way of non-limiting example, for this material, dipole matrix elements may be equal: $\langle\psi_f|d_k|\psi_a\rangle = \langle\psi_f|d_k|\psi_b\rangle = \langle\psi_b|d_1|\psi_i\rangle = \langle\psi_a|d_1|\psi_i\rangle = \delta$. The pump frequency of the light source is preferably $\omega_p = E$. Again by way of non-limiting example, consider degenerate signal and idler photons (i.e., having the same energy), with $\omega_1 = \omega_2 = E/2$. Energy mismatches calculated from these parameters are $\Delta_1^{(a)} = \Delta_2^{(a)} = \epsilon_a - \epsilon_i - \omega_1 = E/3 - E/2 = -E/6$ and $\Delta_1^{(b)} = \Delta_2^{(b)} = \epsilon_b - \epsilon_i - \omega_1 = 2E/3 - E/2 = E/6$. Preferably, line width $\kappa_j$ is much smaller than the energy E. Accordingly, the RTPA matrix element may be described as, by way of non-limiting example:

$$\begin{aligned} M_r &\equiv \frac{D_{12}^{(a)}}{\Delta_2^{(a)} - i\kappa_a/2} + \frac{D_{21}^{(a)}}{\Delta_2^{(a)} - i\kappa_a/2} + \frac{D_{12}^{(b)}}{\Delta_2^{(b)} - i\kappa_b/2} + \frac{D_{21}^{(b)}}{\Delta_2^{(b)} - i\kappa_b/2} \\ &= 2\delta^2\left(\frac{6}{E - i\kappa_a/2} + \frac{6}{E - i\kappa_b/2}\right) \\ &\approx 6i\delta^2\left(\frac{\kappa_b - \kappa_a}{E^2}\right) \approx 0. \end{aligned} \quad (7)$$

Equation (7) indicates that the RTPA cross-section is typically strongly suppressed when the line-width is small compared to the energy spacing (i.e., when $\kappa_j \ll E$). The ETPA matrix element may be described as, by way of non-limiting example:

$$\begin{aligned} M_e &\equiv -\frac{12\delta^2}{E}(\exp[-iT_e(\Delta^{(a)})] + \exp[iT_e(\Delta^{(b)})]) \\ &= -\frac{12\delta^2}{E}(\exp[-iT_e(-E/6)] + \exp[-iT_e(E/6)]). \\ &= -\frac{24\delta^2}{E}\sin[T_e E/6] \end{aligned} \quad (8)$$

Small terms (e.g., on the order κ/E) are dropped from equation (8). Entanglement time $T_e$ may be chosen to make ETPA matrix element large. By way of non-limiting example, choosing entangled-photon pairs with an entanglement time such that $T_e E/6 = \pi/2 \bmod(\pi)$ yields a large ETPA matrix element (e.g., $|M_e| = 24\delta^2/E \gg 0$). Hence, the ETPA matrix element is much bigger than the RTPA matrix element (i.e., $|M_e| \gg |M_r|$), and there is a high probability of entangled-photon pair absorption and a low probability of random photon pair absorption at a given flux.

FIG. 4 also depicts energy mismatches 440, 445 between virtual state 420 and intermediate states 415, 430. Energy mismatches, which are related to virtual state lifetimes, may be used in calculating both ETPA and RTPA matrix elements and cross-sections. By way of non-limiting example, energy mismatches 440, 445 are equal in the molecule of FIG. 4; however, other types of energy mismatches may be used. Virtual state 420 generally only exists for a short period of time. The lifetime of virtual state 420 is inversely proportional to energy mismatches 440, 445. A larger energy mismatch 440, 445 generally indicates a shorter virtual state lifetime. In symbols, $T_{VS} \sim 1/\Delta_k^{(j)}$, where $T_{VS}$ is the virtual state lifetime of the state, and $\Delta_k^{(j)}$ is the energy mismatch. The energy mismatch between state 415 having energy a and virtual state 420 is given by $\Delta_1^{(a)} = \epsilon_a - \epsilon_i - \omega_1$. The energy mismatch between state 430 having energy $\epsilon_b$ and virtual state 420 is given by $\Delta_1^{(b)} = \epsilon_b - \epsilon_i - \omega_1$. In general, $\Delta_k^{(j)} = \epsilon_j - \epsilon_i - \omega_k$ denotes the energy difference, relative to initial state $\epsilon_i$, between material state energy $\epsilon_j$ and the energy $\omega_k$ supplied by the k-th photon.

Figure 5:
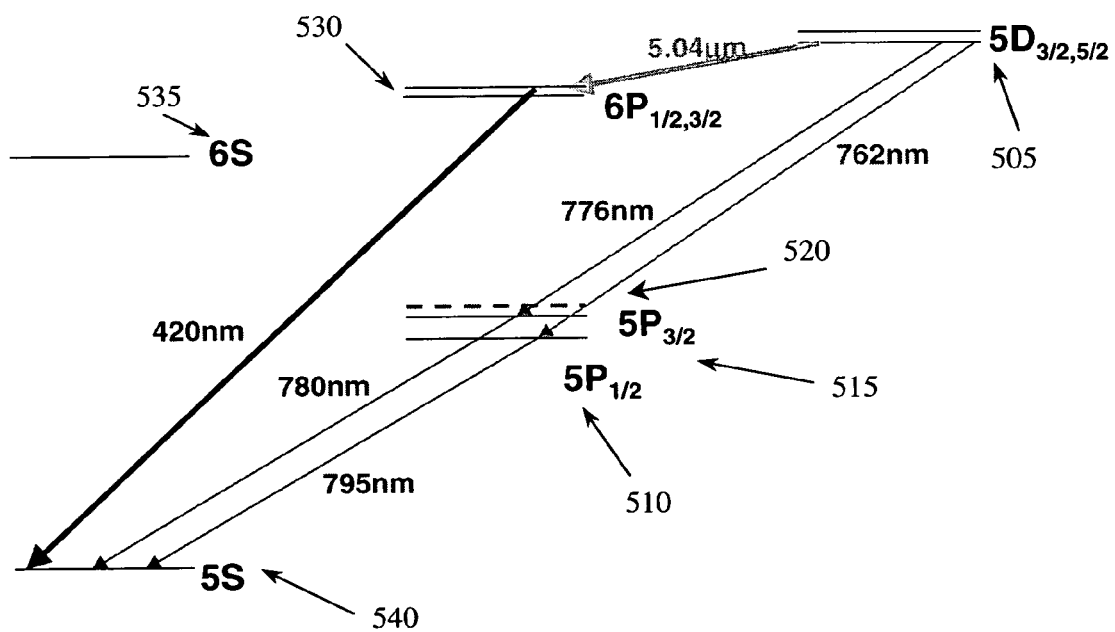
FIG. 5 depicts rubidium-87 ("$^{87}$Rb") energy level de-excitation from an excited 5D state.

FIG. 5 depicts one possible energy level de-excitation for $^{87}$Rb that may be used to detect entangled-photon pair absorption. In particular, FIG. 5 illustrates fluorometric decay paths in a $^{87}$Rb molecule whose outer electron has been excited to a $5D_{3/2, 1/2}$ state 505, which may occur as a result of entangled two-photon absorption. FIG. 5 is associated with the apparatus of FIG. 2. With approximately 40% probability, excited state 505 will decay to ground state 540 (5S) through a $6P_{1/2, 3/2}$ state 530. The transition from excited state 505 to $6P_{1/2, 3/2}$ 530 will produce a 5.04 μm wavelength fluorophoton, while the transition from $6P_{1/2, 3/2}$ to ground 540 produces a 420 nm wavelength fluorophoton. The 420 nm fluorophoton, which may be easily distinguished from the other photons due to its unique frequency, may preferably be detected as an indication of entangled-photon absorption. With approximately 60% probability, the $5D_{3/2, 1/2}$ state 505 will decay to ground state 540 via either $5P_{1/2}$ 510 or $5P_{3/2}$ 515 states. Decay from the initial excited state 505 to $5P_{1/2}$ 510 to ground state 505 releases 776 nm and 780 nm fluorophotons, respectively. Decay from excited state 505 to $5P_{3/2}$ 515 to ground state 505 releases 762 nm and 795 nm fluorophotons, respectively. Any of the aforementioned fluorophotons may be detected as an indicia of entangled-photon absorption.

Figure 6:
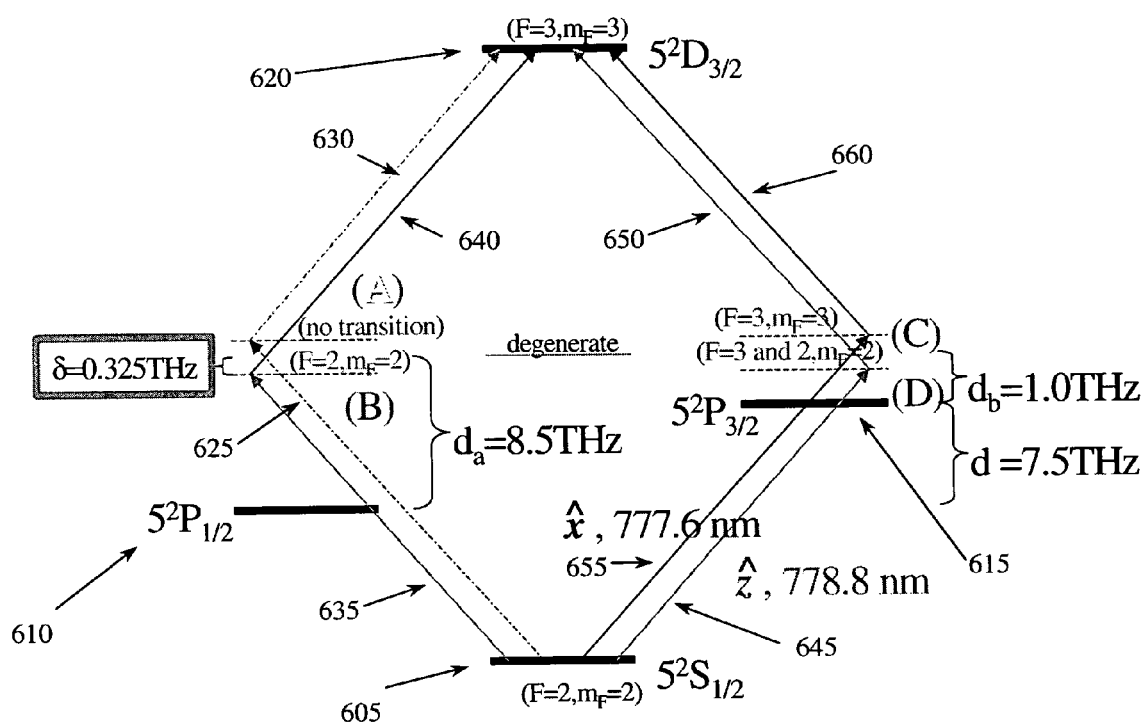
FIG. 6 depicts $^{87}$Rb entangled two-photon absorption energy transitions to a 5D state.

FIG. 6 depicts 5S to 5D $^{87}$Rb entangled two-photon absorption energy transitions. These $^{87}$Rb transitions may be used as a biphoton sensitive material (BSM) that is transparent to random photon pairs; however, other transitions may be used. To verify random photon pair transparency, the RTPA matrix element is calculated and factored as, by way of non-limiting example:

$$M_r = \frac{D_{zx}^{(1/2)}}{\Delta_x^{(1/2)}} + \frac{D_{xz}^{(1/2)}}{\Delta_z^{(1/2)}} + \frac{D_{zx}^{(3/2)}}{\Delta_x^{(3/2)}} + \frac{D_{xz}^{(3/2)}}{\Delta_z^{(3/2)}} \qquad (9)$$
$$\equiv (A+B+C+D) R_{PS} R_{DP}.$$

In equation (9), A, B, C, and D are the angular part of matrix element $M_r$. $R_{PS}$ is the radial part of matrix element $M_r$. More particularly, $R_{PS}$ is the radial part of the matrix element for the transition from ground state S to intermediate state P. $R_{DP}$ is associated with the principle quantum number of matrix element $M_r$. In particular, $R_{DP}$ is the radial part of the matrix element for the transition from intermediate state P to final state D. For z- and x-polarized photons, the transition amplitudes A, B, C, and D from equation (9) are solved for as, by way of non-limiting example:

$$A = \frac{0}{d_a + \delta}, \quad B = \frac{1/(3\sqrt{6})}{d_a - \delta}, \quad C = \frac{1/(5\sqrt{6})}{d_a + \delta}, \qquad (10)$$
$$D = \frac{2/(15\sqrt{6})}{d_b - \delta}.$$

In equation (10), $d_a = (2\pi)$ 8.5 THz, $d_b = (2\pi)$ 1.0 THz and $d = (2\pi)$ 7.5 THz for $^{87}$Rb. These values are meant as illustrative example and are not to be taken as limiting. Terms A, B, C, and D correspond to the first, second, third, and fourth terms in the sum of equation (9), respectively. Again by way of non-limiting example, selecting entangled-photon pairs with distance to degeneracy $\delta = (\omega_1 - \omega_2)/2$ such that $$\delta = d_b \frac{d_a + 5d_b}{5d_a + d_b}$$

results in nearly complete suppression of random two-photon absorption. Note that for this example, the signal and idler energies are not quite degenerate since the distance to degeneracy is not equal to zero (i.e., $\delta \neq 0$). Substituting pinto equation (9) yields, again by way of non-limiting example:

$$B = \frac{1}{15\sqrt{6}} \left( \frac{5d_a + d_b}{d_a^2 - d_b^2} \right) C = \frac{1}{15\sqrt{6}} \left( \frac{5d_a + d_b}{2d_b(d_a + d_b)} \right) \qquad (11)$$
$$D = \frac{-1}{15\sqrt{6}} \left( \frac{5d_a + d_b}{2d_b(d_a - d_b)} \right).$$

Thus, for entangled-photon pair absorption and random photon pair transparency in $^{87}$Rb, the following parameters are preferable: $\delta = (2\pi)$ 0.310 THz, A=0, B=0.00264 per picosecond (ps$^{-1}$), C=0.00991 ps$^{-1}$, and D=-0.01256 ps$^{-1}$. Other parameters, however, may be used in the alternative. Refined calculations, for example, may yield that $\delta = (2\pi)$ 0.320 THz. Alternate calculations may yield that $\delta = (2\pi)$ 0.325 THz. For appropriately selected entangled-photon pairs, the ETPA matrix element may be approximated as, by way of non-limiting example:

$$M_e | R_{PS} R_{DP} = A(1 - \exp(-iT_e\Delta_x^{(1/2)})) + B(1 - \exp(-iT_e\Delta_z^{(1/2)})) + C(1 - \exp(-iT_e\Delta_x^{(3/2)})) + D(1 - \exp(-iT_e\Delta_z^{(3/2)})) \qquad (12)$$

The resulting ETPA transition rate may be approximated as, again by way of non-limiting example:

$$\left| \frac{M_e}{R_{PS} R_{DP}} \right|^2 = -4CD\sin^2(\delta T_e) + \qquad (13)$$
$$2(C+D)[C(\cos(dT_e) - 1) + D(\cos(d + 2\delta)T_e - 1)].$$

Values for $T_e$, $A_e$, and $\tau$, discussed further below, may be selected to increase the probability of entangled-photon pair absorption to desired levels.

FIG. 6 also depicts a $^{87}$Rb entangled two-photon absorption process for a 778.8 nm z-polarized signal photon and a x-polarized 777.6 nm idler photon. In particular, FIG. 6 depicts biphoton absorption exciting a $^{87}$Rb molecule from initial state $5^2S_{1/2}$ 605 with hyperfine structure parameters F=2, $m_F$=2 to final state $5^2D_{3/2}$ 620 with hyperfine structure parameters F=3, $m_F$=3. Other signal and idler wavelengths and material transitions may be used. This particular excitation can occur in three different ways, each associated with a different photon order of arrival and real intermediate energy level 610, 615. In particular, path 635, 640 corresponds to B in equation (9), is associated with the $5^2P_{1/2}$ state, and represents the z-polarized photon arriving before the x-polarized photon. Path 645, 650 corresponds to C in equation (9), is associated with the $5^2P_{3/2}$ state, and represents the x-polarized photon arriving before the z-polarized photon. Path 655, 660 corresponds to D in equation (9) is associated with the $5^2P_{3/2}$ state, and represents the z-polarized photon arriving before the x-polarized photon. Path 625, 630 corresponds to A from equation (9). Because A=0, no transition occurs according to path 625, 630. That is, for the associated $^{87}$Rb state $5^2P_{1/2}$ as illustrated in FIG. 6, no transition occurs when the x-polarized photon is absorbed before the z-polarized photon.

The parameters and configurations (e.g., paths, material, energy levels, hyperfine structure parameters, photon energies, etc.) illustrated by and described in reference to FIG. 6 above are for exemplary purposes and are not meant to be limiting.

Figure 7:
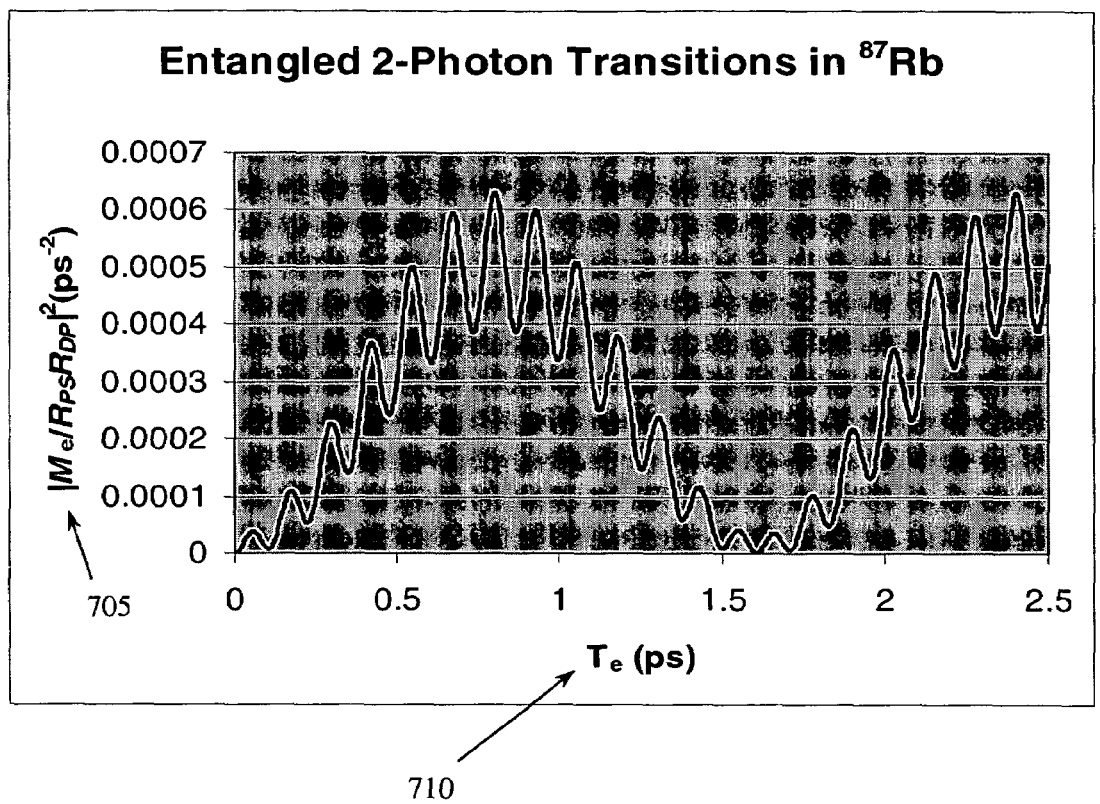
FIG. 7 depicts an approximation to an entangled two-photon absorption matrix element for $^{87}$Rb as a function of entanglement time for the embodiment of FIG. 2.

FIG. 7 is a chart illustrating how entanglement time affects entangled two-photon absorption for the transitions associated with FIG. 6. In FIG. 7, the horizontal axis depicts an approximation 705 to an ETPA matrix element for a 5S to 5D $^{87}$Rb transition, and the vertical axis represents entanglement time 710. By way of non-limiting example, the ETPA matrix element for $^{87}$Rb is large when the entanglement time 710 is approximately 0.833 picoseconds (ps) or 2.40 ps, and small for entanglement times 710 of approximately 0.100 ps or 1.60 ps. An entanglement time of 4.00 ps will also produce a large $^{87}$Rb ETPA matrix element. In general, other materials and their associated ETPA transitions have analogous charts to that of FIG. 7.

In general, entanglement time $T_e$ 710 is a quantity associated with the spread in phase differences between signal and associated idler photons. That is, entanglement time relates to the collection of differences in phase between signal and associated idler photons produced by an entangled photon source (e.g., a non-linear crystal). Entanglement time may be, by way of non-limiting example, considered as the average time difference between when ordinary and extraordinary rays leave a nonlinear crystal. Ordinary rays leaving a non-linear crystal are typically associated with idler photons, and extraordinary rays leaving a nonlinear crystal are typically associated with signal photons. By way of non-limiting example, entanglement time 710 is a function of the length l of a non-linear crystal used to produce the entangled photons, and may be described as $T_e = l(n_o - n_e)/2c$, where $n_o$, $n_e$ are indices of refraction associated with ordinary and extraordinary crystal directions, respectively. To increase the magnitude of the ETPA matrix element, the distance to degeneracy δ multiplied by the entanglement time preferably equals π/2 radians (i.e., $\delta T_e = \pi/2$) in order to maximize the term $\sin(\delta T_e)$. More generally, the distance to degeneracy multiplied by the entanglement time preferably equals an odd integer multiple of π/2 radians (i.e., $\delta T_e = n\pi/2$ for an odd integer n). To increase the magnitude of the ETPA cross-section, it suffices to maximize $|M_e|^2/T_e$. By way of non-limiting example, this yields, for the parameters discussed above in reference to FIG. 6, $T_e = 5\times 10^{-13}$ seconds, and l=5 mm. Other values for δ, $T_e$, and l may be used in the alternative.

Favorable suppression of random entangled-photon absorption may be achieved using larger values for l, which allow for narrow signal photon and idler photon bandwidths. By way of non-limiting example, an entanglement time of $T_e = 2.5\times 10^{-12}$ seconds and a non-linear crystal length of l=25 mm may be used.

Entanglement time 710 generally affects the ETPA cross-section independently from the RTPA cross-section. In most cases, it is typically possible to produce entangled photons with an entanglement time 710 that allows for entangled two-photon absorption, without substantially affecting their random (not entangled) two-photon absorption properties.

Figure 8:
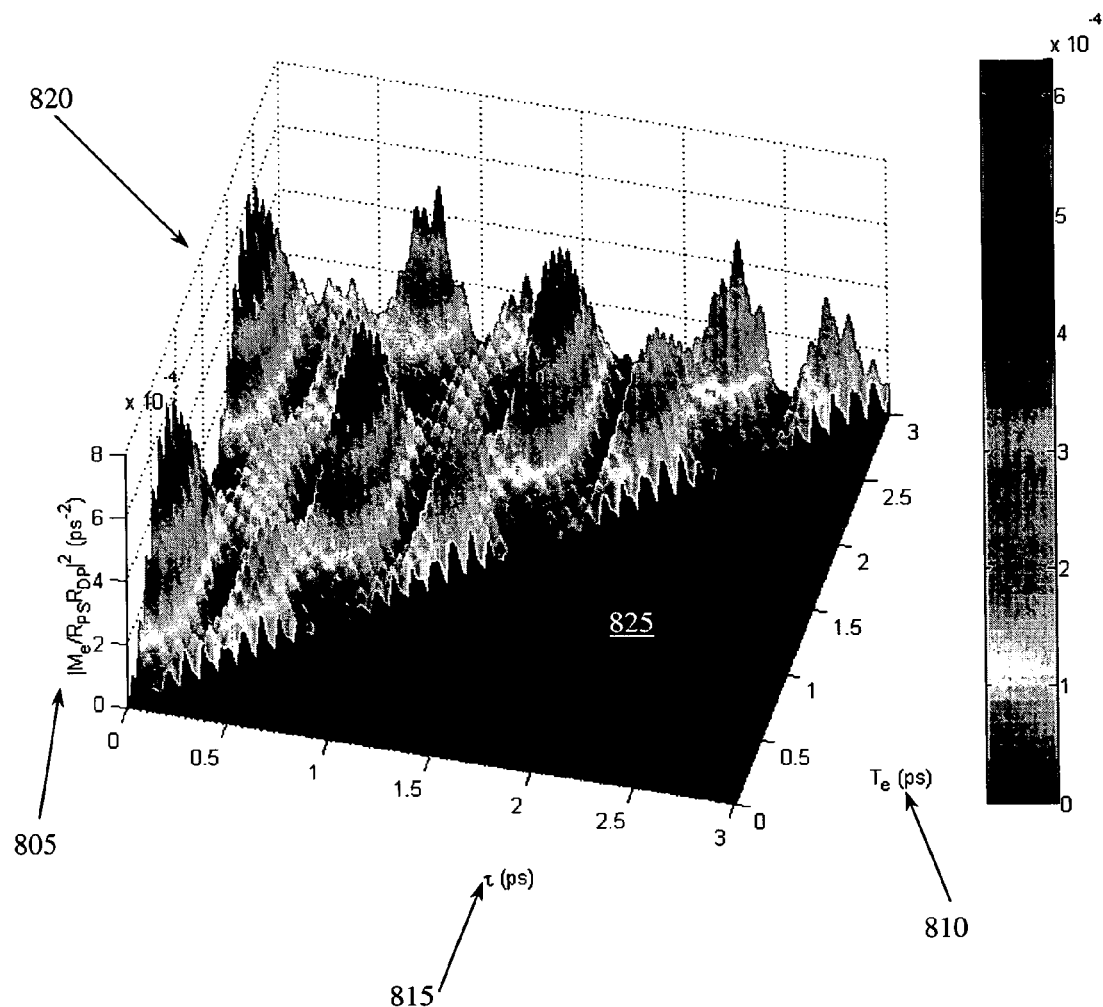
FIG. 8 is a plot of an approximation to an entangled two-photon absorption matrix element for $^{87}$Rb as a function of both entanglement time and delay time for the embodiment of FIG. 2.

FIG. 8 is a chart illustrating how both entanglement time 810 and delay time 815 affect entangled two-photon absorption for the transition of FIG. 6. Delay time 815, denoted "τ", measures how long one photon is delayed with respect to the other. By way of non-limiting example, delay time 815 is accomplished via mirror apparatus portion 250 of FIG. 2. In FIG. 8, ETPA matrix element approximation 805 as a function of entanglement time 810 and delay time 815 may be described as, by way of non-limiting example:

$$\left|\frac{M_e}{R_{PS}R_{DP}}\right|^2 = \qquad (14)$$

$$B^2\cos^2((d_a - \delta)\tau) + C^2\cos^2((d_a + \delta)\tau) + D^2\cos^2((d_b - \delta)\tau) +$$

$$2BC\cos(dT_e)\cos((d_a - \delta)\tau)\cos((d_b + \delta)\tau) +$$

$$2BD\cos((d - 2\delta)T_e)\cos((d_a - \delta)\tau)\cos((d_b - \delta)\tau) +$$

$$2CD\cos(2\delta T_e)\cos((d_b + \delta)\tau)\cos((d_b - \delta)\tau).$$

In equation (14), $R_{PS}$, $R_{DP}$, B, C, D, $d_a$, $d_b$, d, and δ are as above in reference to FIG. 6. FIG. 8 is a plot of equation (14). The entanglement time slice 820 of FIG. 8 for zero delay time (i.e., when τ=0) is identical to the graph of FIG. 7. Region 825 corresponds to the delay time being greater than the entanglement time. In general, other materials and their associated ETPA transitions have analogous charts to that of FIG. 8.

Figure 9:
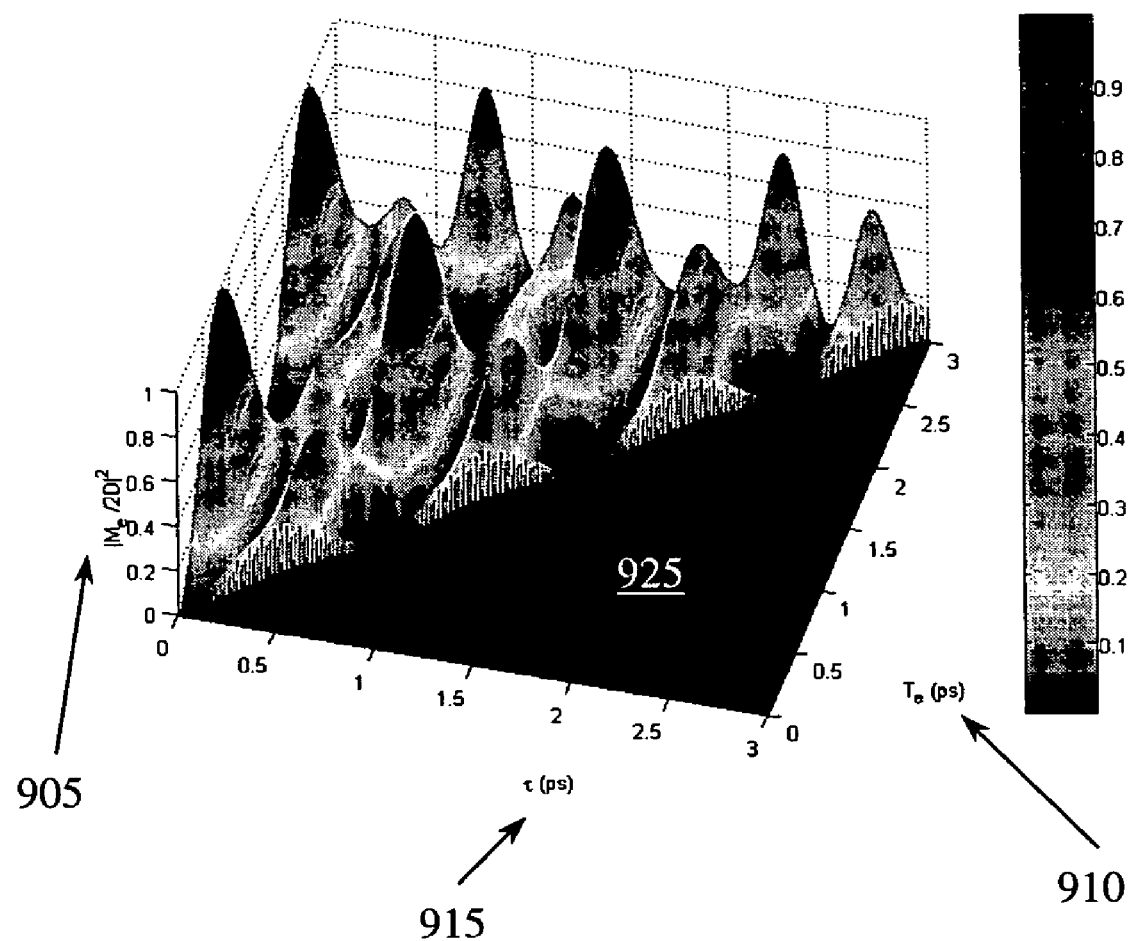
FIG. 9 is a simplified version of the plot of FIG. 8.

FIG. 9 is a plot of a simplified approximation 905 to the ETPA matrix element for $^{87}$Rb associated with FIG. 6 as a function of both entanglement time 910 and delay time 915. That is, FIG. 9 is a plot of the graph depicted in FIG. 8 after high frequency components have been removed. The resulting plot depicts the largest contributing term in the right-hand-side of equation (14), which my be represented as, by way of non-limiting example:

$$\left|\frac{M_e}{R_{PS}R_{DP}}\right|^2 \cong 4D^2[\sin^2 d_b\tau(\sin^2\delta\tau - \sin^2\delta T_e) + \sin^2\delta T_e\cos^2\delta\tau] \qquad (15)$$

where $$|\tau| \leq T_e.$$

where $|\tau| \leq T_e$.

Equation (15) is the result of removing terms dependent on B (these terms are generally smaller than the others) from equation (14). Region 925 corresponds to the delay time being greater than the entanglement time, which makes it appear that the entangled photon originated from outside the nonlinear crystal. Delay time τ may be negative (not shown in FIG. 9) consistent with equation (15).

Figure 10:
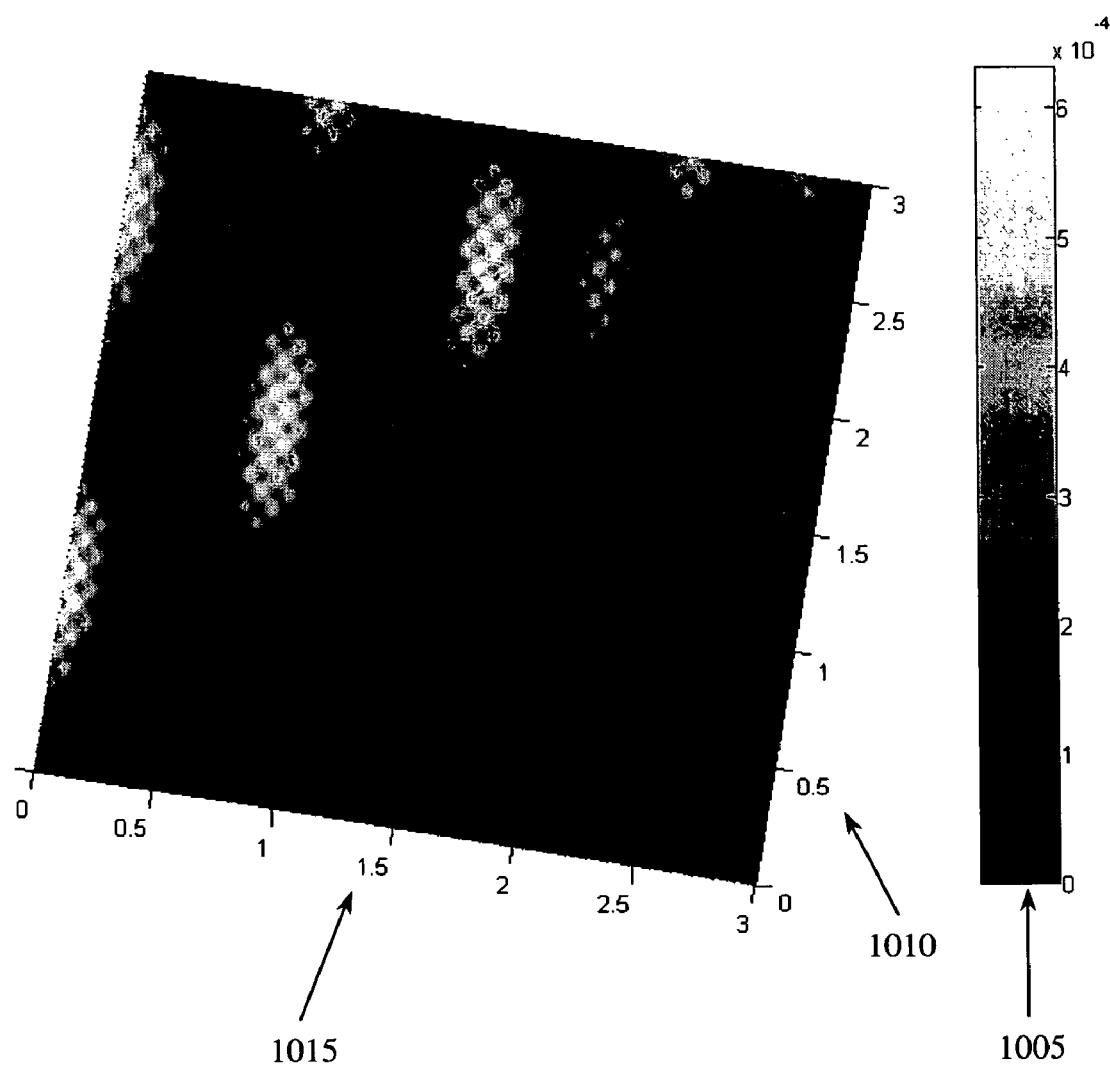
FIG. 10 is a top view detail of the plot of FIG. 8.

FIG. 10 is a top view detail of the plot of FIG. 8. Shades of grey 1005 represent an approximation of the ETPA cross-section described by equation (14) as a function of entanglement time 1010 and delay time 1015.

Figure 11:
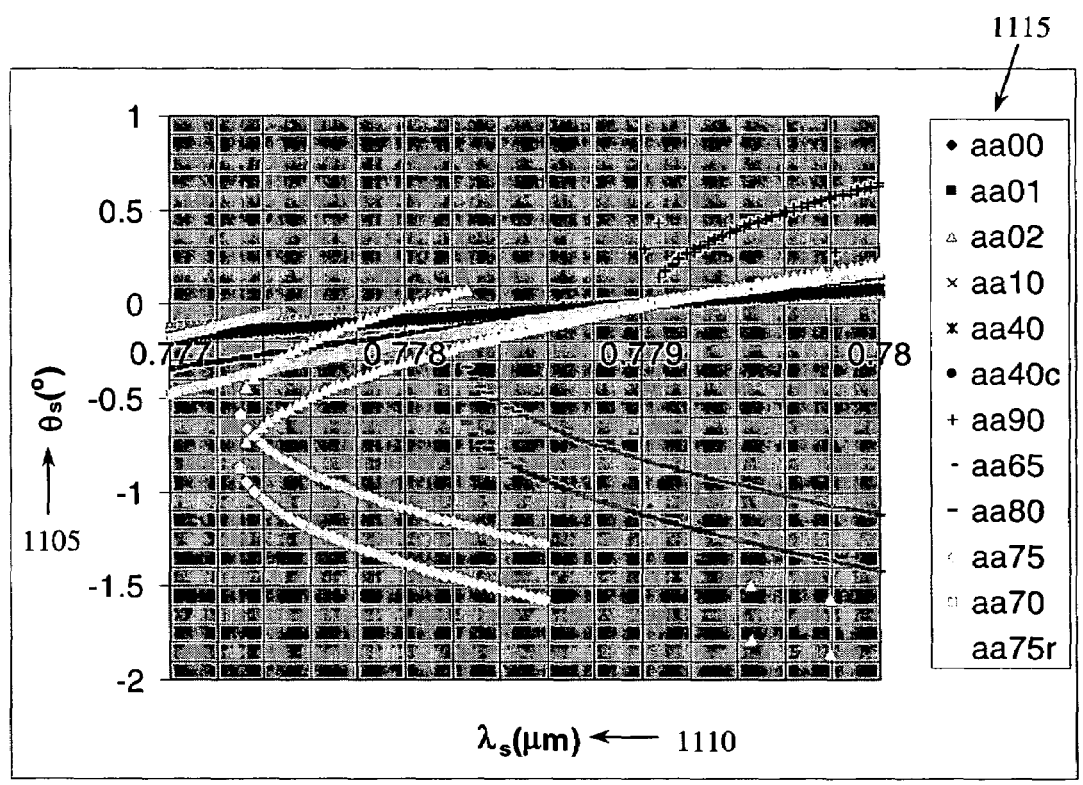
FIG. 11 is a phase matching plot for beta barium borate.

FIG. 11 is a plot of BBO parameters (e.g., wavelengths, angles, etc.) for entangled-photon pair production and selection. Specifically, signal photon wavelengths $\lambda_s$ 1110 at different azimuthal angles aa 1115 appear at different signal photon opening angles $\theta_s$ 1105. Signal photon opening angles $\theta_s$, 1105 are measured in degrees with respect to the originating beam (i.e., the pump beam). Thus, a signal photon opening angle $\theta_s$, 1105 is the angle formed between the pump beam and the signal photon's trajectory. Azimuthal angles aa 1115 are measured from the xz-plane, which may be chosen to be parallel to the crystal sides for uniaxial crystals such as BBO. Azimuthal angles aa 1115 are measured counterclockwise starting from the lower half of the xz-plane to the point at which the signal photon exits the crystal.

One of ordinary skill in the art can calculate corresponding idler photon parameters from the data of FIG. 11. Alternately, a corresponding chart for idler photons may be generated by those of ordinary skill in the art. By way of non-limiting example, techniques for producing such a chart are taught in Boeuf et al., *Calculating Characteristics of Non-collinear Phase-matching in Uniaxial and Biaxial Crystals* (draft Aug. 27, 1999), available from the National Bureau of Standards.

The graph depicted in FIG. 11 may be used to select parameters of a frequency-selective aperture (e.g., 235 of FIG. 2). In particular, the graph of FIG. 11 indicates where signal photons of different wavelengths appear upon exiting the crystal. Idler photon locations may be determined from FIG. 11 or from an analogous chart. By setting a frequency-selective aperture to allow signal photons and corresponding idler photons of particular wavelengths to pass, biphotons of various energy distributions (as measured by, e.g., distance to degeneracy δ of FIG. 6) may be chosen. One of ordinary skill in the art may configure such a frequency-selective aperture using FIG. 11.

The graph depicted in FIG. 11 may also be used to determine entanglement area $A_e$. Entanglement area is a quantity associated with the region in which a single photon gives rise to two entangled photons. The entanglement area may be approximated as, by way of non-limiting example: $A_e \approx \lambda_s \lambda_i / [\sin(\theta_s) \sin(\theta_i)]$, where $\lambda_s$, $\lambda_i$ are the wavelengths of the signal and idler photon, respectively, and $\theta_s$, $\theta_i$ are the opening angles of the signal and idler photons, respectively.

Figure 12:
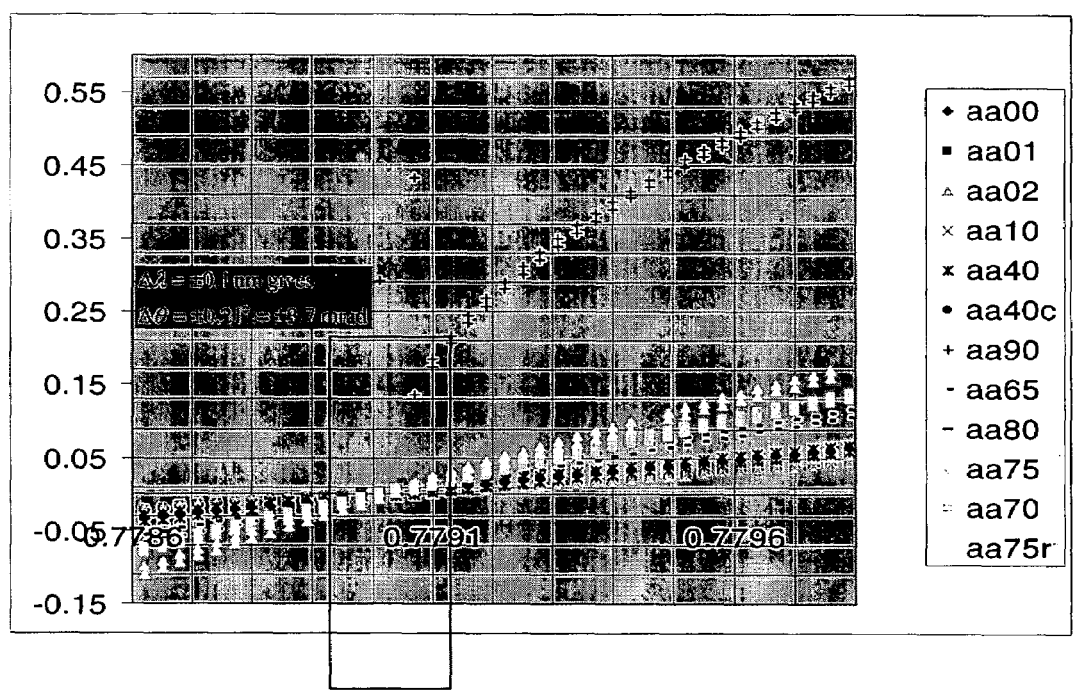
FIGS. 12 and 13 are detail portions of the plot of FIG. 11.
Figure 13:
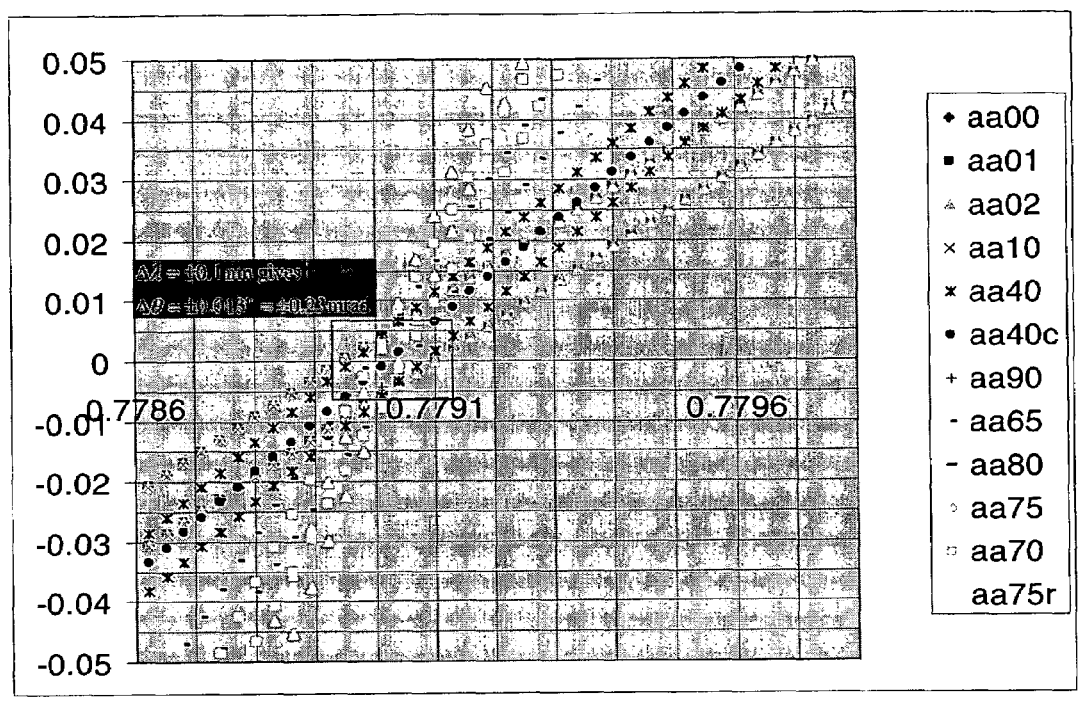

FIGS. 12 and 13 are detail portions of the graph of FIG. 11.

Figure 14:
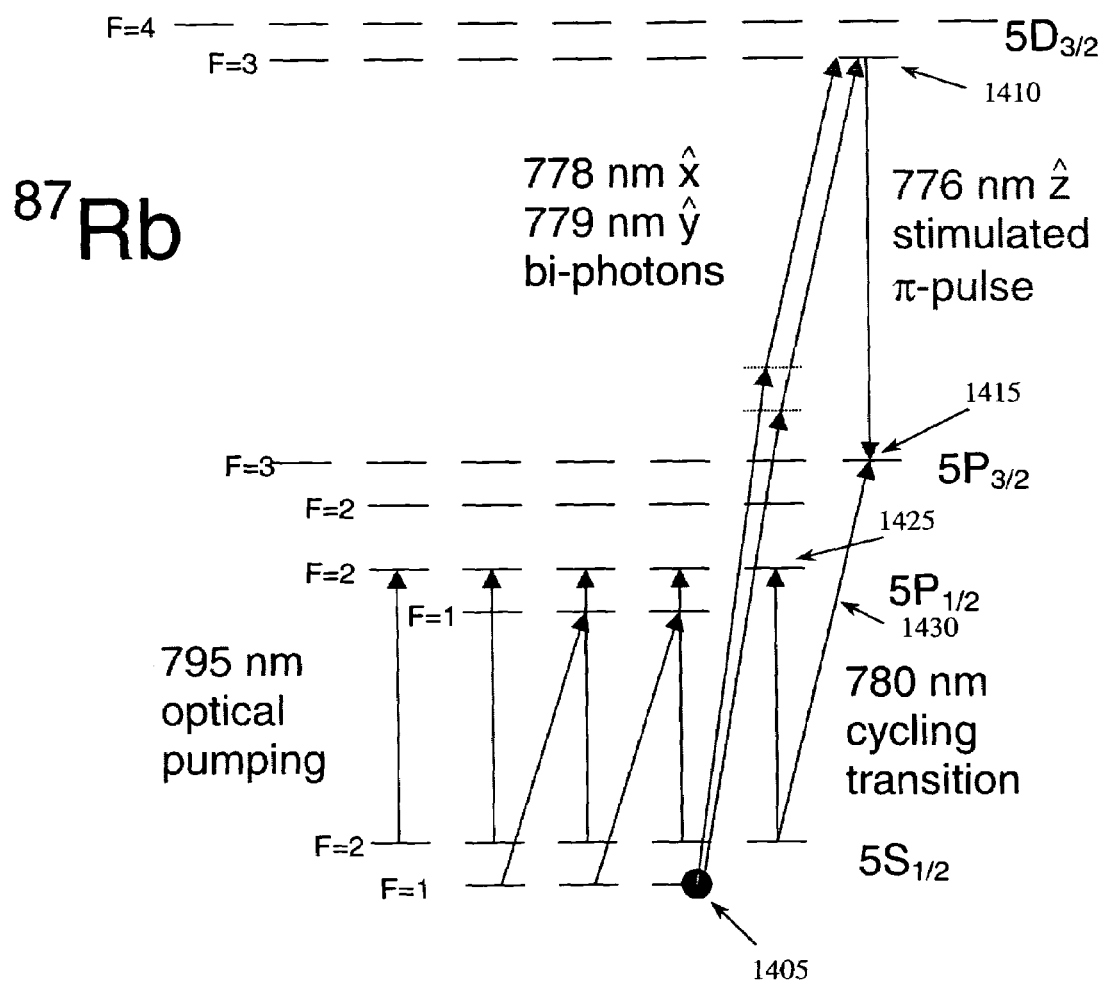
FIG. 14 is a schematic diagram of entangled photon detection using cycling transitions.

FIG. 14 depicts a preferable way to enhance entangled-photon-absorption detection. In particular, FIG. 14 depicts $^{87}$Rb energy levels used for cycling transitions. Preferably, fluorophotons cause repeated cycling of photons, thereby enhancing biphoton-absorption detection. Each row in FIG. 14 corresponds to the total angular momentum taking into account nuclear spin, which is usually denoted by F. Each column corresponds to the projection of F onto the z-axis, normally denoted by $m_f$ (z-axis refers to a convention in the art associated with an alignment of a non-linear crystal). The z-axis here is parallel to a direction of propagation of the signal photons and the idler photons. The $^{87}$Rb is preferably prepared by optically pumping with 795 nm circularly polarized light prior to absorption detection. This conditioning tends to drive the $^{87}$Rb state to $5S_{1/2}$ with hyperfine structure parameters F=1 and $m_f$=1, 1405. The 795 nm optical pump is then turned off, and the $^{87}$Rb receives entangled photons. From this state 1405, entangled-photon absorption excites the $^{87}$Rb to $5D_{3/2}$, F=3, and $m_f$=3 1410. A 776 nm z stimulated laser π-pulse is propagated to the $^{87}$Rb, which causes excited state 1410 to drop to $5P_{3/2}$, F=3, and $m_f$=3, 1415. From there, the state falls to F=2 state 1425, from which it repeatedly gets excited back up to $5P_{3/2}$, F=2, $m_f$=2 state 1425 by way of a 780 nm cycling transition.

Figure 15:
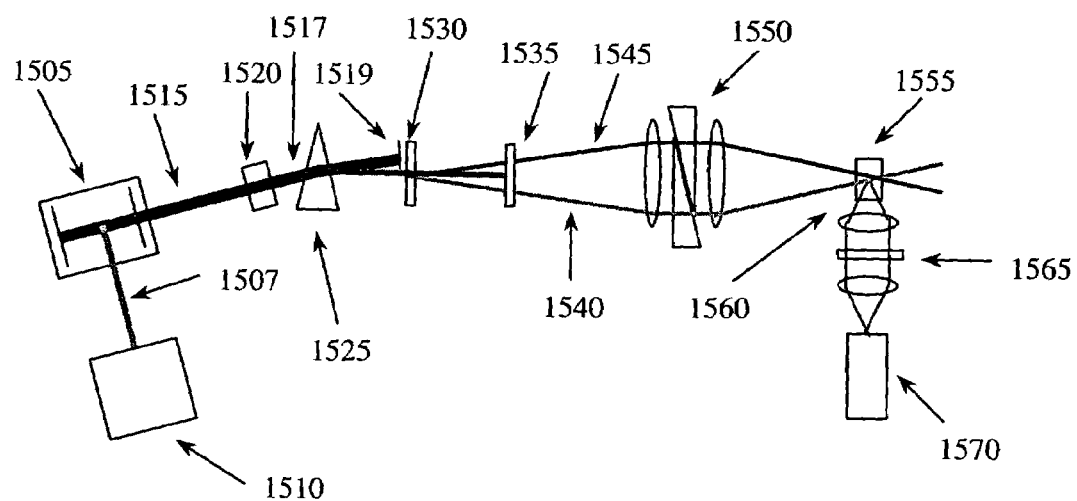
FIG. 15 depicts an apparatus for detecting entangled photons.

FIG. 15 depicts an entangled photon detector. To produce the initial photons, YAG laser 1510 pumps dye laser 1505 with, by way of non-limiting example, 532 nm light 1507. Dye laser 1505 produces 760 nm light 1515, which is directed to doubling crystal 1520. Doubling crystal 1520 converts 760 nm light to 380 nm light 1517. Red block prism 1525 separates 380 nm light from any remaining 760 nm light. Remaining 760 nm light is blocked by shield 1519, and 380 nm light is directed to BBO crystal 1530. Filter 1535 removes 380 nm light that might have passed through BBO crystal 1530, and allows, by way of non-limiting example, 554 nm signal photons 1540 and 1209 nm idler photons 1545 to pass. After variable delay 1550 (e.g., a Babinet compensator) signal photons 1540 and idler photons 1545 are directed to BSM cell 1555 (containing, e.g., $^{87}$Rb). BSM fluoresces in response to entangled photon absorption, producing 420 nm fluorophotons 1560. Interference filter 1565 screens out unwanted photons, allowing only 420 nm fluorophotons 1560 to reach photomultiplier tube 1570. Photomultiplier tube 1570 detects fluorophotons 1560, thereby indicating entangled photon absorption. YAG laser may be, by way of non-limiting example, a DCR2a manufactured by Spectra-Physics of Mountain View, Calif. Dye may be LDS 765, manufactured by Exciton, Inc. of Dayton, Ohio.

Figure 16:
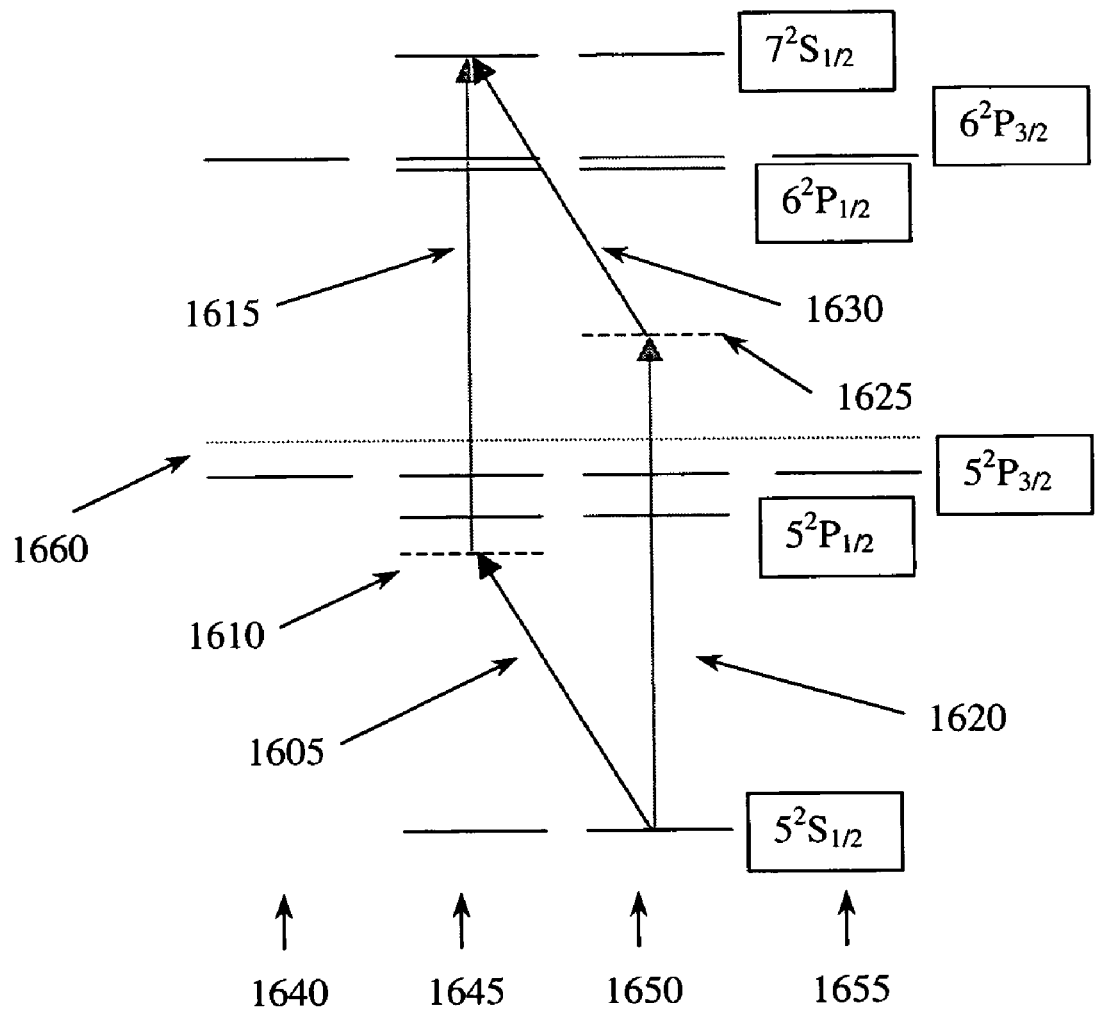
FIG. 16 depicts $^{87}$Rb entangled two-photon absorption energy transitions for the embodiment of FIG. 15.

FIG. 16 depicts an ETPA energy level transition consistent with the apparatus of FIG. 15. That is, FIG. 16 depicts an entangled photon absorption exciting a $^{87}$Rb molecule from initial state $5^2S_{1/2}$ with $m_j$=½ to excited state $7^2S_{1/2}$ with $m_j$=-½ (where $m_j$ is the projection of total angular momentum onto the z-axis). This excitation can occur in two different ways, each associated with a different photon order of arrival. Path 1605, 1615 corresponds to the x-polarized 1209 nm idler photon arriving before the z-polarized 554 nm signal photon. In this path, idler photon 1605 transitions the energy level to virtual state 1610. Separate amplitudes exist for each of the four intermediate states $5^2P_{1/2}$, $5^2P_{3/2}$, $6^2P_{1/2}$, and $6^2P_{3/2}$ with $m_j$=-½ for this order of photon arrival. Path 1620, 1630 corresponds to the z-polarized 554 nm signal photon arriving before the x-polarized 1209 nm idler photon. In this path, signal photon 1605 transitions the energy level to virtual state 1625. There are similarly separate amplitudes for each of the four intermediate states $5^2P_{1/2}$, $5^2P_{3/2}$, $6^2P_{1/2}$, and $6^2P_{3/2}$ with $m_j$=½ when the signal photon arrives before the idler photon. Each column of FIG. 16 corresponds to a different total angular momentum projection onto the z-axis (i.e., $m_j$). In particular, columns 1640, 1645, 1650, 1655 correspond to an $m_j$ of -³⁄₂, -½, ½, and ³⁄₂, respectively. The photon degeneracy level is denoted in FIG. 16 by line 1660. The above-described transition is exemplary and is not meant to be limiting.

The transition between $5^2S_{1/2}$ and $7^2S_{1/2}$ energy levels depicted in FIG. 16 has several advantages. In particular, it is the only transition that can be driven according to the pump frequency, and the distance from actual to virtual states is large compared with the hyperfine splittings. Initial and final state preparation is therefore unnecessary. Additionally, the detuning from degeneracy δ is relatively large, approximately 146 THz. This allows for strong suppression of RTPA that is relatively insensitive to variations in signal and idler photon frequencies.

Figure 17:
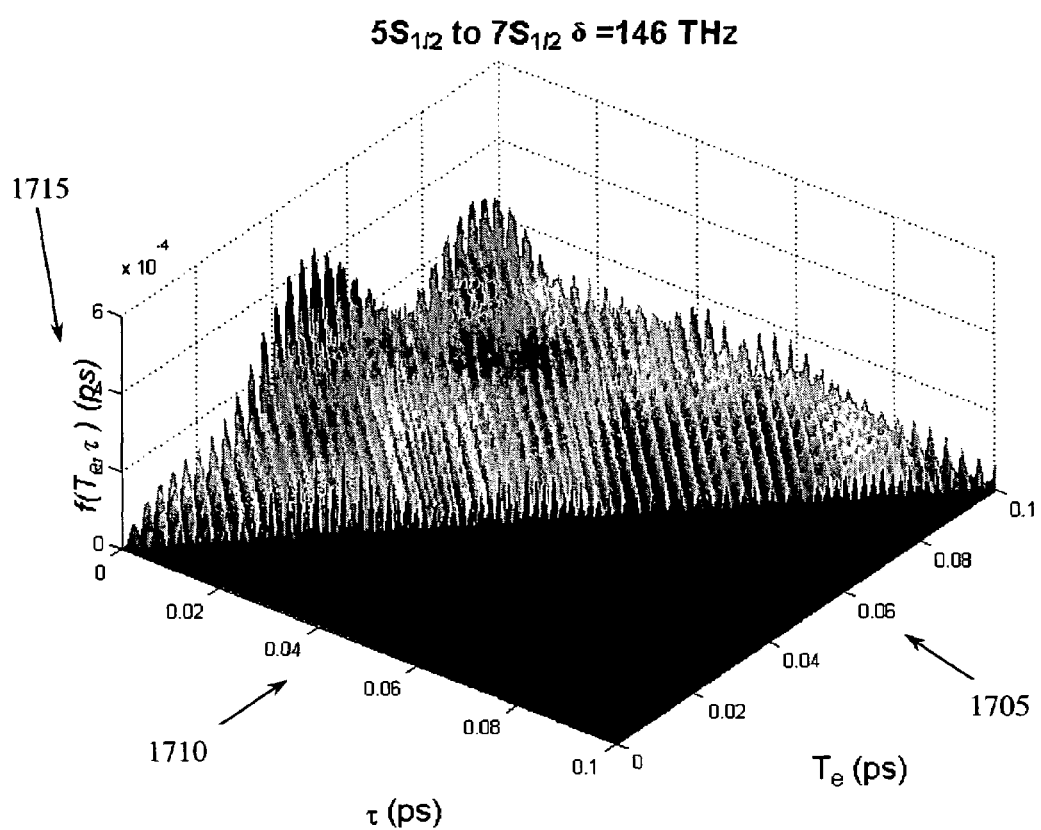
FIG. 17 is a plot of an approximation to an entangled two-photon absorption cross-section for $^{87}$Rb consistent with the embodiment of FIG. 15.

FIG. 17 is a plot of an approximation to an entangled two-photon absorption cross-section for $^{87}$Rb consistent with the embodiment of FIGS. 15 and 16. ETPA cross-section may be described, by way of non-limiting example, as:

$$\sigma_e = \frac{\pi\omega_s\omega_i |M_e|^2}{4T_e A_e \Delta\omega_p} = \frac{\pi\omega_s\omega_i}{4A_e \Delta\omega_p} \frac{R_{7SSP}^2 R_{5PSS}^2}{81} f(T_e, \tau). \quad (16)$$

The parameters of equation (16) are the same as those described above in reference to equation (4), except $\Delta\omega_p$ represents the bandwidth of the pump laser, $R_{7SSP}^2=1.5a_0^2$ is the radial matrix element for the 5P to 7S transition, and $R_{5PSS}^2=26.4a_0^2$ is the radial matrix element for the 5S to 5P transition, where $a_0$ is the Bohr radius. In equation (16), $f(T_e, \tau)$ represents the portion of $\sigma_e$ that is dependent on entanglement time and delay times $T_e$ and $\tau$, respectively. It is $f(T_e, \tau)$ that is graphed in FIG. 17. The entanglement area $A_e$ in equation (16) is approximately proportional to the square of the ratio of pump wavelength to signal photon angle. This may be represented as, by way of non-limiting example:

$$A_e \sim \left(\frac{\lambda_p}{\theta_s}\right)^2 = 1.4 \times 10^{-7} \text{cm}^2. \quad (17)$$

The ETPA cross-section for the embodiment of FIGS. 15-17 may be described using equation (11) as, by way of non limiting example:

$$\begin{aligned}\sigma_e &= \frac{\pi(540.667 \times 10^{12})(248.13 \times 10^{12})(2\pi)}{4(1.4 \times 10^{-7})(2 \times 10^9)} \\ &\quad \frac{(1.5)(26.4)(0.529 \times 10^{-8})^4}{81} f(T_e, \tau) \\ &= 9.05 \times 10^{-7} f(T_e, \tau)(\text{cm}^2) \\ \sigma_e^{(max)} &= 9.05 \times 10^{-7}(4.2 \times 10^{-16})(\text{cm}^2) \\ \sigma_e^{(max)} &= 3.8 \times 10^{-22}(\text{cm}^2)\end{aligned} \quad (18)$$

In equation (18), $\sigma_e^{(max)}$ approximates the maximal value that $\sigma_e$ may take on as $T_e$ and $\tau$ vary. Note that $\sigma_e$ and $\sigma_e^{(max)}$ are not limited to the above, exemplary values. Furthermore, the values substituted into equation (15) to arrive at equation (18) are meant to be exemplary and are not meant to be limiting.

Figure 18:
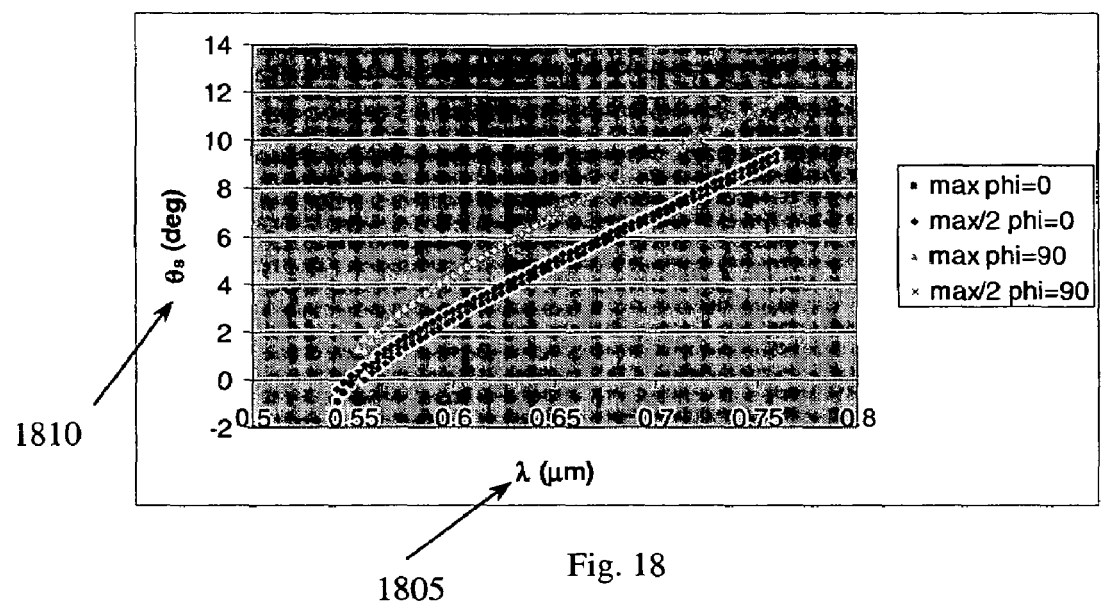
FIG. 18 is a phase-matching plot for beta barium borate that depicts parameters relevant to the embodiment of FIG. 15.

FIG. 18 is a phase-matching plot for beta barium borate that depicts parameters relevant to, inter alia, the embodiment of FIGS. 15-17. In particular, FIG. 18 depicts signal photon angle 1810 as a function of signal photon wavelength 1805 for a pump azimuthal angle of 56°.

The rate of ETPA detection (i.e., the number of ETPA absorption detections per laser pulse) may be described for, inter alia, the embodiment of FIGS. 15-17 as follows. For an exemplary, non-limiting angle between the crystal axis and pump beam of $\theta^p=560$, the non-linear coefficient for BBO may be described as, by way of non-limiting example:

$$\chi_{eff} = \chi_{BBO} \sin^2 \theta^p = \sin^2 \theta_p * 5.5 \times 10^{-9} \text{ cm/statV} = 3.8 \times 10^{-9} \text{ cm/statV} \quad (19)$$

The ratio of signal photon stream power $P_s$ to pump photon stream power $P_p$ may be described as, by way of non-limiting example:

$$\begin{aligned}\frac{P_s}{P_p} &= \frac{4\pi^2 n_s \hbar \omega_s^4 \omega_i l \theta_p^2 \chi_{BBO}^2 \sin^4 \theta_p}{|n_s - n_i| n_p c^4} \\ &= \frac{4\pi^2 (1.590497)(1.054572 \times 10^{-27})}{|-0.061513|(1.61085)(2.998 \times 10^{10})^4} \\ &= 2.48 \times 10^{-6} l \theta_p^2 = 1.24 \times 10^{-7} \theta_p^2\end{aligned} \quad (20)$$

Equation (20) assumes, by way of non-limiting example, a crystal of length l=0.05 cm. The symbols $n_s$, $n_i$, $n_p$ represent the indices of refraction for the signal, idler, and pump photons, respectively, and c is the speed of light. For a YAG laser power of about 3.6 W, it is generally possible to achieve a pump laser power of about 0.5 W. For a 20% doubling crystal efficiency, the average pump power into the BBO crystal would be about 100 mW, or 10 mJ per 5 ns duration pulse at a 10 Hz repeat rate with a $0.5 \times 10^{-7}$ duty factor. With these parameters, the rate of signal photon production at an angle of maximal production may be described as, by way of non-limiting example:

$$\begin{aligned}R_s &= \frac{4\pi^2 n_s \omega_s^3 \omega_i l \theta_p^2 \chi_{BBO}^2 \sin^4 \theta_p}{|n_s - n_i| n_p c^4} P_p \\ &= \frac{4\pi^2 (1.590497)(5.407 \times 10^{14})^3}{|-0.061513|(1.61085)(2.998 \times 10^{10})^4} P_p \\ &= 6.924 \times 10^{12} l \theta_p^2 P_p(W) = 3.46 \times 10^{11} \theta^2 P_p(W)\end{aligned} \quad (21)$$

The parameters of equation (21) are as above. For a signal photon bandwidth spanning 530 nm to 650 nm, the acceptance angle of 5.7° gives a solid angle of 0.01, and $R_s=3.5 \times 10^9 P_p$W. Thus, the average rate of biphoton pair production would be $R_s=3.5 \times 10^8$ s$^{-1}$. This yields a rate of $3.5 \times 10^7$ biphotons produced per laser pulse. At 340° C., $^{87}$Rb density is $\rho=10^{17}$ cm$^{-3}$. For a beam divergence of 0.1 radian, an entanglement area of $(4 \mu m)^2$ can typically be maintained over about 40 μm longitudinally. These parameters give an absorption probability of $P_{abs}=\sigma\rho l_{int}=1.5 \times 10^{-7}$. With a detection efficiency of $\eta_{det}=10^{-3}$ this gives a detection rate $R_{det}=\eta_{det} R_s P_{abs}=0.05$ s$^{-1}$, or one ETPA detection every 200 laser pulses. Note that the calculations, quantities, and parameters considered in this paragraph are exemplary, and are not meant to be limiting.

In other embodiments of the present invention, multiply-entangled photon absorption may be detected. Multiply-entangled photons are three or more photons entangled together. By way of non-limiting example, entangled photon triples (three photons entangled together) or quadruples (four photons entangled together) may be used. Multiply-entangled photons consisting of greater than four photons may also be used. Those of ordinary skill in the art will appreciate that the techniques disclosed herein may be used to detect multiply-entangled photons without detecting one or multiple random photons. The term "entangled photons" refers to both multiply-entangled photons and to entangled photon pairs.

Entangled photon detection has a variety of applications. By way of non-limiting example, entangled-photon pairs can carry information in their delay times. Each entangled-photon pair can encode one of several (e.g., three, four, eight, 50, etc.) information states, each information state represented by a different specific delay time. A sender modulates information into a plurality of entangled photon pairs by delaying one photon (by way of non-limiting example, the signal photon) of each pair according to the desired information state encoded by that pair. A receiver determines which delay time each entangled-photon pair encodes by passing the entangled-photon pairs through a bank of BSM cells.

Figure 19:
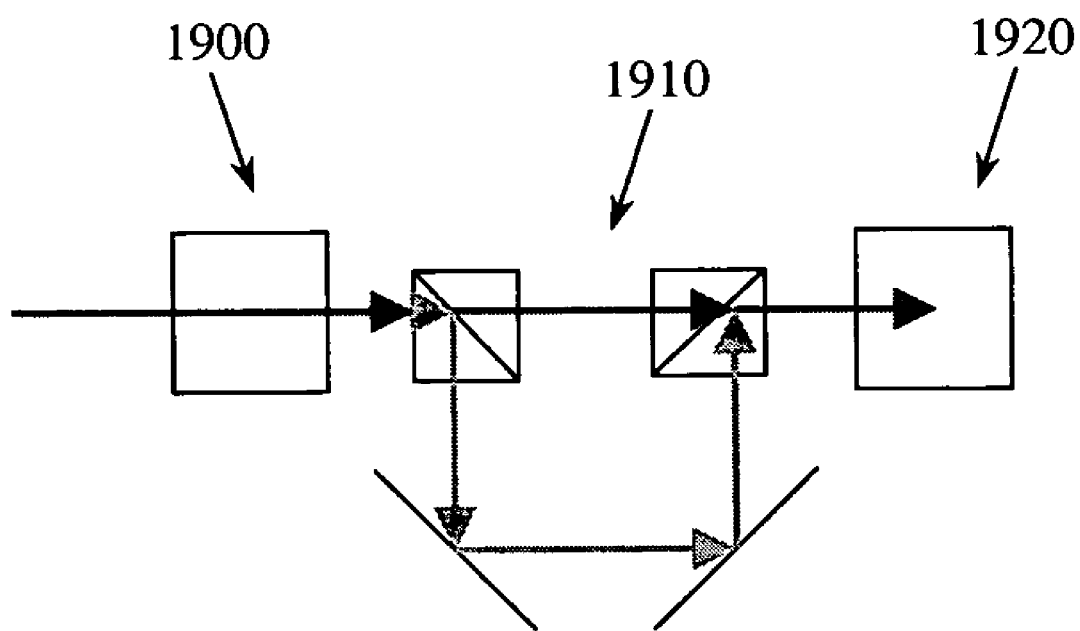
FIG. 19 depicts a receiver for information-encoded biphotons.

FIG. 19 depicts, by way of non-limiting example, a bank of two such BSM cells 1900, 1920. Each BSM cell is separated from its neighboring cell by a delay line 1910 designed to delay one of the photons (in this non-limiting example, the idler photon) by a particular delay time. In FIG. 19, BSM cell 1900 is separated from BSM cell 1920 by delay line 1910. An entangled-photon pair with a delay time of τ will be absorbed by the n-th BSM cell, where the cumulative delay times produced by the delay lines after the first n−1 BSM cells sum to τ. The delay time encoded by a particular entangled-photon pair may thereby be determined by monitoring which BSM cell registers an ETPA absorption. In this manner, entangled-photon pairs may carry multi-state information. For a particular embodiment where each entangled-photon pair carries one of two states in its delay time, standard binary encoding may be affected. Similarly, by using $2^n$ distinguishable delays, it is possible to encode n bits of information in single entangled pair. Multiply-entangled photons (e.g., three or more) may also carry information in delay times among each component photon.

In general the terms "signal" and "idler" may be used interchangeably herein.

Entangled photons may be produced according to a variety of methods. Those of ordinary skill in the art are capable of producing entangled-photon pairs, triples, etc. By way of non-limiting example, entangled photons may be produced according to types I or II parametric down-conversion. Those of ordinary skill in the art are capable of producing entangled-photon pairs, triples, etc. By way of non-limiting example, entangled photons may be produced according to types I or II parametric down-conversion. That is, biphotons whose constituent signal and idler photons are orthogonally polarized may be used as well as biphotons whose constituent signal and idler photons are polarized in parallel. For type-I down-conversion, signal photons may be separated from idler photons (and recombined with idler photons) using dichroic glass/mirrors. For both types of downconversion, signal photons and idler photos may be selected as they exit the biphoton source by providing apertures at the appropriate angles. Furthermore, any nonlinear crystal, not limited to BBO, may be used. Other ways to produce entangled photons include: excited gasses, materials without inversion symmetry, and generally any properly phase-matched medium. Entangled photon production consistent with this disclosure is not limited to using BBO or any other particular non-linear crystal. Furthermore, the entangled photons are not limited to any particular wavelength or frequency. Biphotons whose constituent signal and idler photons are orthogonally polarized may be used as well as biphotons whose constituent signal and idler photons are polarized in parallel.

In other embodiments of the present invention, various indicia of entangled-photon absorption may be used to detect entangled photons. By way of non-limiting example, entangled-photon absorption may result in fluorescence, phosphorescence, direct electron transfer, or ionization of the absorbing material. Detecting fluorescence, phosphorescence, direct electron transfer, or ionization may be used to detect entangled-photon absorption. Also by way of non-limiting example, avalanche photodiodes, photo multiplier tubes (PMT), or other devices may be used to detect the fluorophotons, ionization, direct electron transfer, or other absorption indicia.

In other embodiments of the invention, the BSM is not limited to $^{87}$Rb. By way of non-limiting example, any material with appropriately structured energy levels, such as cesium-133 ($^{133}$Cs) or other alkalis may be used. Preferably, such materials are those with a very narrow multi-photon absorption linewidth. More preferably, such materials are those with a very narrow multi-photon transition to an excited state that decays through a path that includes a radiative transition. Appropriate BSM materials may be in solid, liquid, gaseous, or plasma states. Colloids are also contemplated. In some embodiments of the present invention, quantum dots may be used. Further, embodiments of the invention are not limited to any particular ETPA or RTPA electron energy level transition. Pump, signal, and idler photon frequencies and wavelengths may vary from those disclosed herein.

Generally, random photon rejection not absolute and not all entangled photons are detected. Preferably, the BSM absorbs no more than 10% of random photons directed to it. More preferably, the BSM absorbs no more than 1% of random photons directed to it. Still more preferably, the BSM absorbs no more than 0.1% of the random photons directed to it. Even more preferably, the BSM absorbs no more than 0.01% of entangled photons directed to it. Depending on, inter alia, the entangled photon rate, the absorption rate of random photons may be made as small as one wishes within the constraints of native dark noise in the detector. For some embodiments, random photon absorption rates of less than 10% are acceptable. Regarding entangled-photon absorption, preferably, at least 20% of entangled photons directed to the BSM are absorbed. More preferably, between 20% and 90% of entangled photons directed to the BSM are absorbed. Still more preferably, at least 90% of entangled photons directed at the BSM are absorbed. Even more preferably, at least 99% of entangled photons directed to the BSM are absorbed. Entangled photon absorption rates of up to about 99.99% of are contemplated for some embodiments. Regarding differences between ETPA and RTPA cross sections, preferably, the ETPA cross-section is greater than the RTPA cross-section by an order of magnitude. More preferably, the ETPA cross-section is greater than the RTPA cross-section by two or more orders of magnitude. It is contemplated, however, that for some embodiments of the present invention an the ETPA cross-section greater than the RTPA cross-section by less than one order of magnitude will suffice. In those embodiments an ETPA/RTPA cross-section difference that produces an observable difference in absorbing entangled photons versus absorbing random photons may suffice. Note also that the ratio of random photon absorption to entangled-photon absorption rates is a function of, inter alia, the spread of frequencies (i.e., bandwidth) of signal photons. This ratio is also a function of, inter alia, the idler photon bandwidth. Preferably, the frequency spread of signal (and idler) photons is small.

The equations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

The particular optical manipulation devices depicted herein are illustrative and representative and are not meant to be limiting. By way of non-limiting example, prisms, apertures, filters, optical fiber, lenses, and particular lasers disclosed herein may be replaced with devices known to those of ordinary skill in the art.

As recited herein, the terms "sending" and "receiving" are meant to be interpreted broadly. By way of non-limiting example, both sending and receiving may take place in the same physical apparatus, location, or environment. Alternately, sending can occur at a first location and receiving can occur at a second location that is physically separated from the first. Transmission from one terrestrial point to another terrestrial point, from one terrestrial point to a vehicle, from a vehicle to a terrestrial point, or between vehicles is contemplated. In addition, transmission between a terrestrial point or vehicle and a satellite in Earth's orbit is also contemplated.

Other embodiments of the present invention may calculate entanglement area $A_e$ according to the following, which describes a non-limiting exemplary technique for such computation. It is typically possible to calculate fourth-order correlation height and width coefficients. In the direction defined by the x-axis, and for a given signal photon at location $x_s$, the idler photon in location $x_i$ will generally arrive within $\Delta x$ of $x_s$ (i.e., $x_i = x_s \pm \Delta x$). Similarly, in the z-axis direction, and for a given signal photon at location $z_s$, the idler photon in location $z_i$ will arrive within $\Delta z$ of $z_s$ (i.e., $x_i = z_s \pm \Delta z$). The quantities $\Delta x$ and $\Delta z$ may generally be computed using fourth-order correlation theory. The entanglement area $A_e$ may be derived as the product of $\Delta x$ and $\Delta z$ (i.e., $A_e = \Delta x \Delta Z$).

Other embodiments of the present invention may calculate entanglement time according to the following, which describes a non-limiting exemplary technique. Entanglement time $T_e$ may be calculated as a function of crystal length l. In particular, entanglement time may be described as $T_e = l[2(1/v_i c - 1/v_s c)]$, where $v_s$, $v_i$ are the group velocities of the signal and idler photons, respectively, and c is the speed of light in a vacuum.

Other embodiments of the present invention may delay one photon in various ways. By way of non-limiting example, a length of optical fiber may be inserted into the path of one or both photons. Alternately, sets of mirrors may be used to increase the path length of one or both photons. Other techniques for delaying one or more photons may also be used.

Note that this disclosure follows standard physics notational conventions. By way of non-limiting example, in some places Planck's constant h and the speed of light c are both considered to be one (1) for the purpose of calculations. This convention allows, inter alia, for common units for frequency and energy, as well as common units for time and distance. This notational convention is accounted for after calculations have been performed in order to deduce correct units for application purposes. This disclosure also uses Dirac bracket notation (e.g., $|\psi_i\rangle$), known to those of ordinary skill in the art, to denote quantum states.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of detecting entangled-photon pairs configured to have a predetermined quantum state relationship with a prepared target medium, each entangled-photon pair comprising a signal photon and an idler photon, the method comprising:
   supplying the target medium;
   configuring a quantum state of the target medium relative to the entangled-photon pairs thereby producing the prepared target medium, wherein the prepared target medium has a quantum state configured to substantially increase an entangled two-photon cross-section for the entangled-photon pairs and decrease a random two-photon absorption cross-section for the entangled-photon pairs;
   providing entangled-photon pairs, at least a first portion of the entangled-photon pairs having an entanglement time and an entanglement area to substantially increase an associated entangled two-photon cross-section of the prepared target medium;
   ensuring that at least a second portion of the entangled-photon pairs have an energy distribution between the signal photon and the idler photon to substantially decrease an associated random two-photon absorption cross section of the target medium;
   directing photons included in the first portion and the second portion to the target medium;
   detecting at least one entangled-photon pair being absorbed by the target medium; and
   outputting an electrical signal representing said detecting.

2. The method of claim 1 wherein said detecting comprises detecting at least one of fluorescence, phosphorescence, direct electron transfer, and ionization.

3. The method of claim 1 wherein said providing comprises providing a coherent light source directed at a nonlinear crystal.

4. The method of claim 1 wherein the target medium comprises one of rubidium, cesium, and an alkali.

5. The method of claim 1 where the target medium comprises a quantum dot.

6. A method of detecting entangled-photon pairs configured to have a predetermined quantum state relationship with a prepared target medium, each entangled-photon pair comprising a signal photon and an idler photon, the method comprising:
   supplying a target medium;
   configuring a quantum state of the target medium relative to the entangled-photon pairs thereby producing the prepared target medium, wherein the prepared target medium has a quantum state configured to substantially increase an entangled two-photon cross-section for the entangled-photon pairs and decrease a random two-photon absorption cross-section for the entangled-photon pairs;
   receiving entangled-photon pairs, at least a portion of the entangled-photon pairs configured to have at least one of: an entanglement time to substantially maximize an associated entangled photon cross-section of the prepared target medium, and an entanglement area to substantially maximize an associated entangled photon cross-section of the prepared target medium;
   the entangled photon pairs having an energy distribution among the signal photon and the idler photon in each pair to substantially minimize an associated random two-photon absorption cross-section of the prepared target medium;

detecting at least one entangled-photon pair being absorbed by the prepared target medium; and outputting an electrical signal representing said detecting.

7. The method of claim 6 wherein said detecting comprises at least one of detecting fluorescence, detecting phosphorescence, detecting direct electron transfer, and detecting ionization.

8. The method of claim 6 where the target medium comprises one of rubidium, cesium, and an alkali.

9. The method of claim 6 where the target medium comprises a quantum dot.

10. A method of providing entangled-photon pairs configured to have a large entangled-photon pair cross section and a small random photon pair cross section relative to a prepared target medium, the method comprising:

supplying a target medium;

configuring a quantum state of the target medium relative to the entangled-photon pairs thereby producing the prepared target medium, wherein the prepared target medium has a quantum state configured to substantially increase an entangled two-photon cross-section for the entangled-photon pairs and decrease a random two-photon absorption cross-section for the entangled-photon pairs;

providing entangled photon pairs having at least one of an entanglement time to substantially maximize an associated entangled photon cross-section for the prepared target medium, and an entanglement area to substantially maximize an associated entangled photon cross-section for the prepared target medium;

selecting entangled-photon pairs having an energy distribution among a signal photon and an idler photon to substantially minimize an associated random photon pair absorption cross section of the prepared target medium; and sending the entangled photons to a receiver, the receiver configured to cause at least a portion of the entangled photons to come into contact with the prepared target medium.

11. The method of claim 10 further comprising detecting at least one of fluorescence, phosphorescence, direct electron transfer, and ionization.

12. The method of claim 10 wherein said entangled photon source comprises a nonlinear crystal.

13. The method of claim 10 wherein the target medium comprises one of rubidium, cesium, and an alkali.

14. A method of detecting entangled photons, the entangled photons configured to have a predetermined quantum relationship with a prepared target medium, the method comprising:

supplying a target medium;

configuring a quantum state of the target medium relative to the entangled photons thereby producing the prepared target medium, wherein the prepared target medium has a quantum state configured to substantially increase an entangled multi-photon cross-section for the entangled-photon pairs and decrease a random multi-photon absorption cross-section for the entangled photons;

producing entangled photons tailored for entangled photon absorption by the prepared target medium;

conditioning the entangled photons to reduce random multi-photon absorption by the target medium;

directing the entangled photons to the prepared target medium;

detecting at least one entangled-photon absorption by the prepared target medium; and outputting an electrical signal representing said detecting.

15. The method of claim 14 wherein the entangled photons comprise entangled photon pairs.

16. The method of claim 15 further comprising delaying one photon of each entangled-photon pair by a predetermined amount of time.

17. The method of claim 14 wherein said conditioning comprises selecting entangled photons having a predetermined energy distribution among the photons comprising each pair.

18. The method of claim 14 wherein said detecting comprises detecting at least one of fluorescence, phosphorescence, direct electron transfer, and ionization.

19. The method of claim 14 wherein:

said producing comprises producing single photons having a pump frequency consistent with a predetermined energy level transition of the target medium; and said producing further comprises splitting the single photons into entangled-photon pairs.

20. The method of claim 14 wherein the target medium comprises one of rubidium, cesium, and an alkali.

21. The method of claim 14 where the target medium comprises a quantum dot.

22. The method of claim 14 wherein said producing comprises producing according to an entanglement time and an entanglement area, at least one of the entangled photon time and the entangled photon area selected to increase entangled-photon absorption by the target medium.

23. A method of providing entangled photons configured to have a high entangled-photon absorption and low random multi-photon absorption for a corresponding predetermined and prepared target medium, the method comprising:

supplying a target medium configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;

producing entangled photons tailored for entangled photon absorption by the prepared target medium;

conditioning the entangled photons to reduce random multi-photon absorption by the prepared target medium;

sending the entangled photons to a receiver, the receiver configured to cause at least a portion of the entangled photons to come into contact with the prepared target medium.

24. The method of claim 23 wherein the entangled photons comprise entangled-photon pairs.

25. The method of claim 24 further comprising delaying one photon of each entangled-photon pair by a predetermined amount of time.

26. The method of claim 24, wherein said conditioning comprises selecting entangled-photon pairs having a predetermined energy distribution among the photons comprising each pair.

27. The method of claim 23 further comprising detecting at least one of fluorescence, phosphorescence, direct electron transfer, and ionization.

28. The method of claim 23 wherein the target medium comprises one of rubidium, cesium, and an alkali.

29. The method of claim 23 where the target medium comprises a quantum dot.

30. The method of claim 23 wherein:
said producing comprises producing single photons having a pump frequency consistent with a predetermined energy level transition of the target medium; and
said producing further comprises splitting the single photons into entangled-photon pairs.

31. The method of claim 23 wherein said producing comprises producing according to an entanglement time and an entanglement area, at least one of the entangled photon time and the entangled photon area selected to increase entangled-photon absorption by the target medium.

32. The method of claim 23 wherein said producing comprises producing using a nonlinear crystal.

33. A method of detecting entangled photons configured to have a predetermined quantum state relationship with a prepared target medium, the method comprising:
supplying a target medium;
configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;
receiving entangled photons, the entangled photons being tailored for entangled-photon absorption by the prepared target medium, the entangled photons being conditioned to reduce random multi-photon absorption by the prepared target medium;
causing the entangled photons to come into contact with the prepared target medium;
detecting at least one entangled-photon absorption by the prepared target medium; and
outputting an electrical signal representing said detecting.

34. The method of claim 33 wherein the entangled photons comprise entangled-photon pairs.

35. The method of claim 34 wherein the entangled photons comprise entangled-photon pairs selected to have a predetermined energy distribution among the photons comprising each pair.

36. The method of claim 34 further comprising delaying one photon of each entangled-photon pair by a predetermined amount of time.

37. The method of claim 33 wherein the entangled photons have an entangled photon time and an entangled photon area, at least one of the entangled photon time and the entangled photon area selected to increase entangled-photon absorption by the prepared target medium.

38. The method of claim 33 wherein said detecting comprises detecting at least one of fluorescence, phosphorescence, direct electron transfer, and ionization.

39. The method of claim 33 wherein the target medium comprises one of rubidium, cesium, and an alkali.

40. The method of claim 33 where the target medium comprises a quantum dot.

41. A system for detecting entangled photons configured to have a predetermined quantum state relationship with a prepared target medium, the system comprising:
a prepared target medium configured to have a quantum state to substantially increase an entangled photon cross-section for the entangled photons and decrease a random multi-photon absorption cross-section for the entangled photons;
an entangled photon source configured to produce entangled photons tailored for entangled-photon absorption by the prepared target medium;
a screen configured to pass entangled photons having an energy distribution selected to reduce random multi-photon absorption by the prepared target medium; and
a sensor configured to detect entangled-photon absorption by the prepared target medium.

42. The system of claim 41 wherein the system further comprises a line for delaying at least one photon from each set of entangled photons by an amount of time selected to increase entangled photon absorption by the prepared target medium.

43. The system of claim 41 wherein said entangled photon source is configured to produce entangled photon having an entanglement area, the entanglement area selected to increase entangled-photon absorption by the prepared target medium.

44. The system of claim 41 wherein said entangled photon source is configured to produce entangled photon having an entanglement time, the entanglement time selected to increase entangled-photon absorption by the prepared target medium.

45. The system of claim 41 wherein said sensor is configured to detect at least one of fluorescence, phosphorescence, direct electron transfer, and ionization.

46. The system of claim 41 wherein said entangled photon source comprises a nonlinear crystal.

47. The system of claim 41 wherein the target medium comprises one of rubidium, cesium, and an alkali.

48. The method of claim 41 where the target medium comprises a quantum dot.

49. A system for producing entangled photons having high entangled-photon absorption and low random multi-photon absorption for a prepared target medium, the prepared target medium configured to have a predetermined quantum relationship with the entangled photons, the system comprising:
a prepared target medium having a predetermined quantum state relative to the entangled photons, wherein the prepared target medium has a quantum state configured to substantially increase an entangled photon cross-section for the entangled photons and decrease a random multi-photon absorption cross-section for the entangled photons;
an entangled photon source configured for producing entangled photons tailored for entangled-photon absorption by the prepared target medium; and
a screen configured to pass entangled-photon pairs having an energy distribution selected to reduce random photon absorption by the prepared target medium.

50. The system of claim 49 wherein the entangled photon source is configured to produce entangled-photon pairs.

51. The system of claim 50, further comprising a delay line configured to delay one photon of each entangled-photon pair by a predetermined amount of time.

52. The system of claim 49 further comprising a sensor configured to detect entangled-photon absorption by the prepared target medium.

53. The system of claim 49 wherein said sensor is capable of detecting at least one of fluorescence, phosphorescence, direct electron transfer, and ionization.

54. The system of claim 49 wherein said entangled photon source comprises:
a photon source configured to produce photons having a pump frequency consistent with a predetermined energy level transition of the prepared target medium; and
a nonlinear crystal configured to split the photons into entangled photon pairs.

55. The system of claim 49 wherein the nonlinear crystal comprises a beta barium borate crystal.

56. The system of claim 49 wherein said entangled photon source is configured to produce entangled photons having an entanglement time, the entanglement time selected to increase entangled-photon absorption by the prepared target medium.

57. The system of claim 49 wherein said entangled photon source is configured to produce entangled photons having an entanglement area, the entanglement area selected to increase entangled-photon absorption by the prepared target medium.

58. The system of claim 49 wherein the target medium comprises one of rubidium, cesium, and an alkali.

59. The method of claim 49 where the target medium comprises a quantum dot.

60. A system for detecting entangled photons configured to have a predetermined quantum state relationship with a prepared target medium, the system comprising:
    a prepared target medium configured with a quantum state to absorb entangled photons tailored for entangled-photon absorption by the prepared target medium, the entangled photons being conditioned to reduce random photon absorption by the prepared target medium; and
    a sensor configured to detect at least one entangled photon absorption by the prepared target medium.

61. The system of claim 60 wherein said prepared target medium is selected to absorb entangled-photon pairs.

62. The system of claim 60 wherein said prepared target medium is selected to pass random photon pairs, where the random photon pairs are formed from entangled-photon pairs having a predetermined energy distribution among the photons comprising each entangled-photon pair.

63. The system of claim 60 wherein said prepared target medium is selected to absorb entangled-photon pairs having one photon of each entangled-photon pair delayed by a predetermined amount of time.

64. The system of claim 60 wherein said prepared target medium is selected to absorb entangled photons having a predetermined entanglement time.

65. The system of claim 60 wherein said prepared target medium is selected to absorb entangled photons having a predetermined entanglement area.

66. The system of claim 60 wherein said sensor is capable of detecting at least one of fluorescence, phosphorescence, direct electron transfer, and ionization.

67. The system of claim 60 wherein the prepared target medium comprises one of rubidium, cesium, and an alkali.

68. A method of detecting entangled photons configured to have a predetermined relationship with a prepared target medium, the method comprising:
    supplying a target medium;
    configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;
    producing entangled photons having properties for entangled-photon absorption by the prepared target medium;
    preparing the entangled photons to reduce random photon absorption by the prepared target medium;
    directing the entangled photons to the prepared target medium;
    detecting at least one entangled-photon absorption by the prepared target medium; and
    outputting an electrical signal representing said detecting.

69. A method of providing entangled photons having a high entangled-photon absorption rate for a prepared target medium, the entangled photons configured to have a predetermined quantum state relationship with the prepared target medium, the method comprising:
    supplying a target medium;
    configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;
    producing entangled photons having properties for entangled-photon absorption the prepared target medium;
    preparing the entangled photons to reduce random photon absorption by the prepared target medium; and
    sending the entangled photons to a receiver, the receiver configured to cause at least a portion of the entangled photons to come into contact with the prepared target medium.

70. A method of detecting entangled photons using a prepared target medium, the entangled photons configured to have a predetermined quantum state relationship with the prepared target medium, the method comprising:
    supplying a target medium;
    configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;
    receiving entangled photons, the entangled photons having properties for entangled-photon absorption by the prepared target medium;
    preparing the entangled photons to reduce random photon absorption by the prepared target medium;
    causing the entangled photons to come into contact with the prepared target medium;
    detecting at least one entangled-photon absorption by the prepared target medium; and
    outputting an electrical signal representing said detecting.

71. A system for detecting entangled photons using a prepared target medium, the entangled photons configured to have a predetermined quantum state relationship with the prepared target medium the method comprising:
    supplying a target medium;
    configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;
    an entangled photon source configured to produce entangled photons having properties for entangled-photon absorption by the prepared target medium;
    a screen configured to pass entangled photon having an energy distribution selected to reduce random photon absorption by the prepared target medium; and
    a sensor configured to detect entangled-photon absorption by the prepared target medium.

72. A system for producing entangled photons having high entangled-photon absorption using a prepared target medium, the entangled photons configured to have a predetermined quantum state relationship with the prepared target medium, the method, the system comprising:

supplying a target medium;

configuring a quantum state of the target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;

an entangled photons source configured for producing entangled photons having properties for entangled-photon absorption by the prepared target medium; and a screen configured to pass entangled photons having an energy distribution selected to reduce random photon absorption by the prepared target medium.

73. A system for detecting entangled photons using a prepared target medium, the entangled photons configured to have a predetermined quantum state relationship with the prepared target medium, the system comprising:

a prepared target medium configured to have a quantum state to substantially increase an entangled photon cross-section for the entangled photons and decrease a random multi-photon absorption cross-section for the entangled photons;

a screen configured to select entangled photons having reduced random photon absorption by the prepared target medium; and a sensor configured to detect entangled photon absorption by the prepared target medium.

74. A system for detecting entangled photons using a prepared target medium, the entangled photons configured to have a predetermined quantum state relationship with the prepared target medium, the system comprising:

means for configuring a quantum state of a target medium relative to the entangled photons thereby producing the prepared target medium, wherein the prepared target medium has a quantum state configured to substantially increase an entangled photon cross-section for the entangled photons and decrease a random multi-photon absorption cross-section for the entangled photons;

means for producing entangled photons having properties for entangled-photon absorption by the prepared target medium;

means for selecting entangled photons having reduced probability of random photon absorption by the prepared target medium;

means for to absorbing entangled photons having properties suitable for entangled-photon absorption by the prepared target medium; and means for detecting entangled photon absorption by the target medium.

* * * * *

UNITED STATES PATENT AND TRADEMARK OFFICE
CERTIFICATE OF CORRECTION

PATENT NO. : 7,609,382 B2 Page 1 of 1
APPLICATION NO. : 10/850394
DATED : October 27, 2009
INVENTOR(S) : Kastella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this

Twelfth Day of October, 2010

David J. Kappos
*Director of the United States Patent and Trademark Office*